(12) United States Patent
Gao et al.

(10) Patent No.: US 11,934,832 B2
(45) Date of Patent: Mar. 19, 2024

(54) SYNCHRONIZATION INSTRUCTION INSERTION METHOD AND APPARATUS

(71) Applicant: HUAWEI TECHNOLOGIES CO., LTD., Guangdong (CN)

(72) Inventors: Xiong Gao, Hangzhou (CN); Kun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 17/558,076

(22) Filed: Dec. 21, 2021

(65) Prior Publication Data

US 2022/0113971 A1 Apr. 14, 2022

Related U.S. Application Data

(63) Continuation of application No. PCT/CN2020/098021, filed on Jun. 24, 2020.

(30) Foreign Application Priority Data

Jun. 24, 2019 (CN) .......................... 201910551144.9

(51) Int. Cl.
*G06F 9/30* (2018.01)
*G06F 8/41* (2018.01)
*G06F 9/38* (2018.01)

(52) U.S. Cl.
CPC .......... *G06F 9/30087* (2013.01); *G06F 8/433* (2013.01); *G06F 9/3838* (2013.01)

(58) Field of Classification Search
None
See application file for complete search history.

(56) References Cited

U.S. PATENT DOCUMENTS 6,438,747 B1 * 8/2002 Schreiber ................ G06F 8/452
717/160
7,853,937 B2 12/2010 Janczewski
(Continued)

FOREIGN PATENT DOCUMENTS

| CN | 1952900 A | 4/2007 |
|---|---|---|
| CN | 101833440 A | 9/2010 |

(Continued)

OTHER PUBLICATIONS

'Race Detection and Reachability in Nearly Series-Parallel DAGs' by Agrawal et al., Copyright 2018 by SIAM. (Year: 2018).*

(Continued)

*Primary Examiner* — Steven G Snyder
(74) *Attorney, Agent, or Firm* — Fish & Richardson P.C.

(57) ABSTRACT

This application discloses example synchronization instruction insertion methods and example apparatuses. One example method includes obtaining a first program block comprising one or more statements, where each of the one or more statements includes one or more function instructions. A first function instruction and a second function instruction between which data dependency exists in the first program block can then be determined. A synchronization instruction pair between a first statement including the first function instruction and a second statement including the second function instruction can then be inserted.

19 Claims, 21 Drawing Sheets

(56) References Cited

U.S. PATENT DOCUMENTS

| | | | |
|---|---|---|---|
| 8,381,203 B1* | 2/2013 | Beylin | G06F 8/458 717/149 |
| 8,479,185 B2* | 7/2013 | Kalogeropulos | G06F 8/452 717/160 |
| 8,966,453 B1* | 2/2015 | Zamfir | G06F 11/3604 717/124 |
| 9,684,581 B2 | 6/2017 | Kerr et al. | |
| 10,002,031 B2* | 6/2018 | Llamas | G06F 9/52 |
| 11,061,654 B1* | 7/2021 | Borkovic | G06N 3/02 |
| 2007/0234326 A1* | 10/2007 | Kejariwal | G06F 9/3857 717/149 |
| 2010/0269102 A1* | 10/2010 | Latorre | G06F 9/3851 717/130 |
| 2012/0151463 A1 | 6/2012 | Kalogeropulos et al. | |
| 2014/0281727 A1* | 9/2014 | Venkataraman | G06F 11/3632 714/37 |
| 2014/0337848 A1* | 11/2014 | Llamas | G06F 9/52 718/102 |
| 2017/0083343 A1* | 3/2017 | Burger | G06F 9/3802 |
| 2017/0083431 A1* | 3/2017 | Burger | G06F 9/30145 |
| 2021/0232394 A1* | 7/2021 | Hai | G06F 9/3867 |
| 2022/0171630 A1* | 6/2022 | Dang | G06F 9/4881 |
| 2023/0153112 A1* | 5/2023 | Stripf | G06F 8/456 712/216 |

FOREIGN PATENT DOCUMENTS

| | | | |
|---|---|---|---|
| CN | 103003796 A | 3/2013 | |
| CN | 103377035 A | 10/2013 | |
| CN | 110633105 A | 12/2019 | |
| WO | WO-2007073611 A1 * | 7/2007 | G06F 8/445 |

OTHER PUBLICATIONS

'Data-Race Detection: The Missing Piece for an End-to-End Semantic Equivalence Checker for Parallelizing Transformations of Array-Intensive Programs' by Banerjee et al., copyright 2016 ACM. (Year: 2016).*

'Dynamic Data Race Detection for OpenMP Programs' by Gu et al., SC18, Nov. 11-16, 2018. (Year: 2018).*

Chen et al., "DianNao: A Small-Footprint High-Throughput Accelerator for Ubiquitous Machine-Learning," ACM SIGARCH Computer Architecture News, vol. 42, No. 1, Mar. 2014, 15 pages.

Chen et al., "TVM: End-to-End Optimization Stack for Deep Learning," University of Washington Technical Report UW-CSE-2017-12-01, Dec. 2017, 19 pages.

Jouppi et al., "In-Datacenter Performance Analysis of a Tensor Processing Unit," Proceedings of the 44th annual International symposium on computer architecture, Jun. 2017, 12 pages.

PCT International Search Report and Written Opinion issued in International Application No. PCT/CN2020/098021 dated Oct. 9, 2020, 18 pages (with English translation).

Smith, "Decoupled Access/Execute Computer Architectures," Proceedings of the 9th Annual Symposium on Computer Architecture, Apr. 1982, 20 pages.

Wonjeon, "Any scheduling example code for ASIC/FPGA accelerators?" Apache TVM Discussion thread, retrieved from URL <https://discuss.tvm.apache.org/t/any-scheduling-example-code-for-asic-fpga-accelerators/88>, Apr. 2018, 1 page.

KinchengHan, "Questions about memory latency hiding on DSP," Apache TVM Discussion thread, retrieved from URL <https://discuss.tvm.ai/t/questions-about-memory-latency-hiding-on-dsp/1843>, Mar. 2019, 2 pages.

* cited by examiner

– – – ▶ Serial synchronization path
───────▶ Instruction synchronization path

– – – ▶ Serial synchronization path

———▶ Instruction synchronization path

TO

– – – ▶ Serial synchronization path
———▶ Instruction synchronization path

SYNCHRONIZATION INSTRUCTION INSERTION METHOD AND APPARATUS

CROSS-REFERENCE TO RELATED APPLICATIONS

This application is a continuation of International Application No. PCT/CN2020/098021, filed on Jun. 24, 2020, which claims priority to Chinese Patent Application No. 201910551144.9, filed on Jun. 24, 2019. The disclosures of the aforementioned applications are hereby incorporated by reference in their entireties.

TECHNICAL FIELD

This application relates to the computer field, and in particular, to a synchronization instruction insertion method and an apparatus.

BACKGROUND

When executing function instructions of a program, a processor that is based on a decoupled access-execute (DAE) computing architecture or a DAE-like computing architecture may process function instructions of a same function type in series, and process function instructions of different function types in parallel. However, in a conventional technology, a synchronization instruction pair is inserted between adjacent function instructions. Consequently, the two function instructions that can be executed in parallel may be degraded to be executed in series due to existence of a synchronization relationship, resulting in a problem that parallelism between the function instructions degrades.

SUMMARY

This application provides a synchronization instruction insertion method and an apparatus, to improve parallelism between function instructions when a synchronization instruction pair is inserted between the function instructions.

To achieve the foregoing objective, the following technical solutions are used in this application.

According to a first aspect, an embodiment of this application provides a synchronization instruction insertion method. The method may be applied to a computer device, or the method may be applied to a computing apparatus that can support the computer device in implementing the method. For example, the computing apparatus includes a chip system. The method includes: obtaining a first program block including one or more statements; determining a first function instruction and a second function instruction between which data dependency exists in the first program block; and inserting a synchronization instruction pair between a statement to which the first function instruction belongs and a statement to which the second function instruction belongs. Each of the one or more statements includes one or more function instructions. The first function instruction and the second function instruction may be any two function instructions in the first program block.

According to the synchronization instruction insertion method provided in this application, the synchronization instruction pair is automatically inserted between the function instructions based on the data dependency between the function instructions, so that parallelism between the function instructions can be effectively improved. This improves processing performance of a DAE processor or a DAE-like processor in processing the function instructions.

In a possible implementation, the first program block includes a simple statement and/or a compound statement. The simple statement is a statement including only one function instruction, and the compound statement is a statement including a plurality of function instructions, for example, a branch statement or a loop statement.

In a possible implementation, the first function instruction and the second function instruction between which the data dependency exists access data at a same address, and at least one of the first function instruction and the second function instruction updates the data.

In a possible implementation, address ranges of data accessed by the first function instruction and the second function instruction between which the data dependency exists overlap, and at least one of the first function instruction and the second function instruction updates the data.

In a possible implementation, the first function instruction and the second function instruction between which the data dependency exists are used to transfer data by using shared storage space. For example, the first function instruction and the second function instruction are used to transfer the data by using a specific register.

In a possible implementation, a synchronization path graph may be used to indicate a directed dependency relationship between synchronized function instructions. The synchronization path graph includes a plurality of function instruction nodes and a synchronization path between the plurality of function instruction nodes. Each of the plurality of function instruction nodes corresponds to one function instruction, and the synchronization path includes a serial synchronization path and an instruction synchronization path. The serial synchronization path is a path connecting nodes corresponding to two function instructions between which serial dependency exists, and the instruction synchronization path is a path connecting nodes corresponding to two function instructions between which data dependency exists. The serial dependency is a dependency relationship between function instructions processed by one processing unit in a serial manner.

Further, an instruction synchronization path between a node of the first function instruction and a node of the second function instruction is established in a first synchronization path graph.

Further, in the first synchronization path graph, a serial synchronization path is established for function instructions between which serial dependency exists. For example, a serial synchronization path between the node corresponding to the first function instruction and a node corresponding to a third function instruction is established. Serial dependency exists between the first function instruction and the third function instruction. In other words, the first function instruction and the third function instruction are executed by a same processing unit in the serial manner.

In a possible implementation, the inserting a synchronization instruction pair between a statement to which the first function instruction belongs and a statement to which the second function instruction belongs includes: inserting, based on the first synchronization path graph, the synchronization instruction pair between the statement to which the first function instruction belongs and the statement to which the second function instruction belongs.

In a possible implementation, the inserting, based on the first synchronization path graph, the synchronization instruction pair between the statement to which the first function instruction belongs and the statement to which the second function instruction belongs includes: determining a synchronization path from the node corresponding to the first function instruction to the node corresponding to the second function instruction is unreachable in the first synchronization path graph; and inserting the synchronization instruction pair between the statement to which the first function instruction belongs and the statement to which the second function instruction belongs. In this embodiment of this application, the synchronization path graph is used to indicate data dependency and serial dependency relationships between the function instructions. For two function instructions between which data dependency exists, a synchronization instruction pair is inserted only when it is determined, based on the synchronization path graph, that a path between the two function instructions is unreachable. In this way, redundancy of a synchronization instruction inserted based on data dependency can be reduced, a decrease in instruction parallelism caused by unnecessary insertion of the synchronization instruction can be avoided, and performance of executing a program by a processor can further be improved.

In a possible implementation, the first program block includes the loop statement, and the method further includes: determining a fourth function instruction and a fifth function instruction between which data dependency exists in the loop statement; determining that a synchronization path from a node corresponding to the fourth function instruction to a node corresponding to the fifth function instruction is unreachable in the first synchronization path graph; and inserting a synchronization instruction pair between a statement to which the fourth function instruction belongs and a statement to which the fifth function instruction belongs.

In a possible implementation, the first program block includes the loop statement, and the method further includes: identifying a fourth function instruction and a fifth function instruction between which data dependency exists in the loop statement; determining that a synchronization path from a node corresponding to the fifth function instruction to a node corresponding to the fourth function instruction is unreachable in the synchronization path graph and a reverse synchronization path graph; and inserting a synchronization instruction pair between a statement to which the fourth function instruction belongs and a statement to which the fifth function instruction belongs. The reverse synchronization path graph is used to indicate a directed dependency relationship between synchronized function instructions in the loop statement. The reverse synchronization path graph includes a plurality of function instruction nodes and a synchronization path between the plurality of function instruction nodes. A direction of a synchronization path between nodes of function instructions indicated in the reverse synchronization path graph is opposite to a direction of a synchronization path between nodes of function instructions indicated in the synchronization path graph.

In a possible implementation, the synchronization instruction pair includes a first synchronization instruction and a second synchronization instruction, and the method further includes: in the first program block into which the synchronization instruction pair is inserted, configuring the second synchronization instruction for the unpaired first synchronization instruction; and/or configuring the first synchronization instruction for the unpaired second synchronization instruction.

Compared with a conventional technology in which paired synchronization instructions are directly inserted before and after the loop statement, in a paired synchronization instruction insertion method provided in this application, the paired synchronization instructions may be stretched forward and backward as much as possible before and after the loop statement. In this way, the paired synchronization instructions are prevented from additionally introducing unnecessary synchronization between the function instructions. Parallelism between the function instructions is further improved by stretching the paired synchronization instructions.

In another possible implementation, the method further includes: if the configured second synchronization instruction and the configured first synchronization instruction constitute the synchronization instruction pair, configuring hoisting tags for the configured second synchronization instruction and the configured first synchronization instruction; and if the loop statement is a statement nested in another loop statement, hoisting the configured second synchronization instruction and the configured first synchronization instruction.

In a multi-layer loop nesting scenario, in the conventional technology, paired synchronization instructions of an inner loop are directly inserted before and after an inner loop statement. In this case, the paired synchronization instructions are executed for a plurality of times with an outer loop, and even the parallelism may be reduced. According to the synchronization instruction insertion method provided in this embodiment of this application, paired synchronization instructions that have not been inserted can be hoisted, and execution of the paired synchronization instructions is reduced by hoisting the paired synchronization instructions. Therefore, the parallelism between the function instructions is further improved by hoisting the paired synchronization instructions.

In a possible implementation, the method further includes: inserting the first synchronization instruction before a first statement in the first program block; or/and inserting the second synchronization instruction after a last statement in the first program block.

In another possible implementation, the synchronization instruction pair includes a first synchronization instruction and a second synchronization instruction, and the method further includes: inserting, in the first program block, the first synchronization instruction after a sixth function instruction outside the loop statement, where data dependency exists between the sixth function instruction and the fifth function instruction in the loop statement, or a synchronization path from a node corresponding to the sixth function instruction to the node corresponding to the fifth function instruction is reachable in the first synchronization path graph; and/or inserting, in the first program block, the second synchronization instruction before the sixth function instruction outside the loop statement, where the data dependency exists between the sixth function instruction and the fifth function instruction in the loop statement, or the synchronization path from the node corresponding to the sixth function instruction to the node corresponding to the fifth function instruction is reachable in the first synchronization path graph.

In a possible implementation, the synchronization instruction pair includes a first synchronization instruction and a second synchronization instruction. The first synchronization instruction is a push instruction, and is used to write a synchronization message into a synchronization queue. The second synchronization instruction is a pop instruction, and is used to obtain the synchronization message from the synchronization queue.

In a possible implementation, the push instruction is executed by a synchronized processing unit, and the push instruction is inserted after a synchronized function instruction. The pop instruction is executed by a synchronizing processing unit, and the push instruction is inserted before a to-be-synchronized function instruction.

In a possible implementation, the push instruction is represented as push(x, y), and the pop instruction is represented as pop(x, y), where x is an ID of the synchronized processing unit, and y is an ID of the synchronizing processing unit.

Unless otherwise specified, the processing unit in this embodiment of this application is a processing unit that is logically independent and that may be executed in parallel with another processing unit.

According to a second aspect, an embodiment of this application further provides a computing apparatus, configured to implement the method described in any one of the first aspect or the possible implementations of the first aspect. The computing apparatus is a computer device or a computing apparatus that supports the computer device in implementing the method described in the first aspect. For example, the computing apparatus includes a chip system.

In a possible implementation, the computing apparatus includes a processor and a memory, and the memory stores a first program block and a compiler program. The processor is configured to run the compiler program, to implement the method described in any one of the first aspect or the possible implementations of the first aspect.

In a possible implementation, the computing apparatus includes one or more function modules configured to implement the method described in any one of the first aspect or the possible implementations of the first aspect. These function modules may be implemented by hardware, or may be implemented by hardware by executing corresponding software. The hardware or software includes one or more modules corresponding to the function. For example, the processor is configured to complete a function of a processing unit, and the memory is configured to store a computer program or an instruction for implementing the method described in any one of the first aspect or the possible implementations of the first aspect. The processor and the memory are connected through a bus and implement mutual communication.

In a possible implementation, the computer program for implementing the method described in any one of the first aspect or the possible implementations of the first aspect is stored in a computer-readable storage medium.

According to a third aspect, an embodiment of this application further provides a computer device, configured to implement the method described in any one of the first aspect or the possible implementations of the first aspect. For example, the computer device includes a processor, configured to implement a function of the method described in the first aspect. The computer device may further include a memory, configured to store a program instruction and data. The memory is coupled to the processor, and the processor may invoke and execute the program instruction stored in the memory, to implement the method described in any one of the first aspect or the possible implementations of the first aspect. The computer device may further include a communications interface, and the communications interface is used by the computer device to communicate with another device. For example, if the computer device is a network device, the another device is a terminal. If the computer device is a terminal, the another device is a network device.

According to a fourth aspect, an embodiment of this application further provides a computer device, including at least one processor and a memory coupled to the at least one processor. The memory is configured to store a computer program, and the computer program includes a program into which a synchronization instruction is inserted according to the method described in any one of the first aspect or the possible implementations of the first aspect. The computer program into which the synchronization instruction is inserted is executed by the at least one processor.

According to a fifth aspect, this application further provides a computer-readable storage medium, including a computer instruction. When the computer instruction is executed by a processor, the processor is enabled to perform the method described in any one of the first aspect or the possible implementations of the first aspect.

According to a sixth aspect, this application further provides a computer program product including an instruction. When the instruction is run by a processor, the method described in any one of the first aspect or the possible implementations of the first aspect is performed.

According to a seventh aspect, this application provides a chip system. The chip system includes at least one processor and a memory coupled to the at least one processor. The memory stores a computer program, and the computer program includes a program into which a synchronization instruction is inserted according to the method described in any one of the first aspect or the possible implementations of the first aspect. The computer program into which the synchronization instruction is inserted is executed by the at least one processor, to implement a corresponding function.

In a possible implementation, the chip system may include a plurality of chips, or may include a chip and another discrete component.

In addition, for technical effects brought by the designs of any one of the foregoing aspects, refer to technical effects brought by different designs of the first aspect. Details are not described herein again.

DESCRIPTION OF EMBODIMENTS

Figure 1:
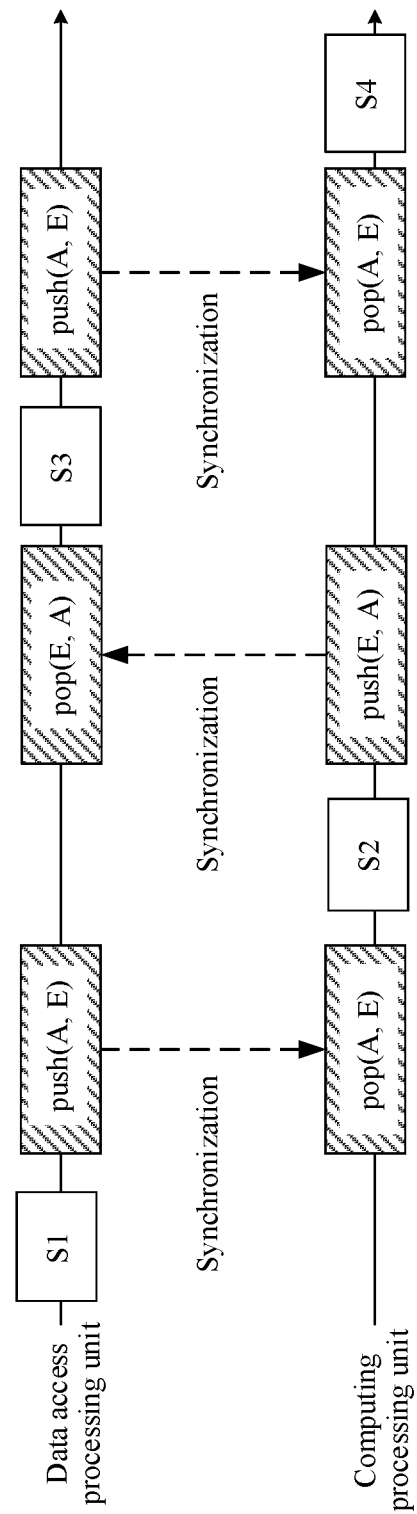
FIG. 1 is a schematic diagram of an instruction sequence execution time sequence according to the prior art.

In the specification, claims, and accompanying drawings of this application, the terms "first", "second", "third" and the like are intended to distinguish different objects but do not limit a particular sequence.

In addition, in embodiments of this application, the word "example" or "for example" is used to represent giving an example, an illustration, or a description. Any embodiment or design scheme described as the word "example" or "for example" in the embodiments of this application should not be explained as having more advantages than another embodiment or design scheme. Exactly, use of the word "example", "for example", or the like is intended to present a relative concept in a specific manner.

The term "plurality of" indicates two or more, and another quantifier is similar to the term "plurality of". The term "and/or" describes an association relationship for describing associated objects and represents that three relationships may exist. For example, A and/or B may represent the following three cases: Only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Furthermore, "at least one (at least one of) . . . " means one or any combination of subsequent associated objects. For example, "at least one of A, B, and C" includes A, B, C, AB, AC, BC, or ABC.

For clear and brief description of the following embodiments, a related technology is briefly described first.

DAE processor or DAE-like processor: The DAE processor or the DAE-like processor may be divided into a plurality of logically independent processing units (or referred to as decoupled processing units) based on a function type of a function instruction. Each processing unit may execute instructions (or referred to as function instructions) of a same function type in a serial manner. Different processing units may execute function instructions of different function types in a parallel manner. When a program (or referred to as an instruction sequence) is executed, performance of the entire target program can be significantly improved by executing function instructions in parallel. The DAE processor or the DAE-like processor is widely applied to a specific field (for example, an artificial intelligence (AI) field) with a data computing-intensive feature, and the like.

In some embodiments, the DAE processor or the DAE-like processor may include two processing units: a data access processing unit and a computing processing unit. The data access processing unit is configured to execute a memory read/write instruction. The computing processing unit is configured to execute a logical computing instruction. Optionally, the data access processing unit and the computing processing unit may be further divided to obtain more processing units. For example, the data access processing unit may be further divided into a data loading processing unit, a data storage processing unit, and the like. The data loading processing unit is configured to execute the memory read instruction. The data storage processing unit is configured to execute the memory write instruction. In actual application, a processing unit with more functions may be obtained through division based on a requirement. This is merely an example for description. This is not limited in this application. In this specification, for ease of description, in all examples, it is assumed that the DAE processor or the DAE-like processor includes the data access processing unit and the computing processing unit. An identification (ID) of the data access processing unit may be abbreviated as A, and an identification of the computing processing unit may be abbreviated as E.

According to a specification of the DAE processor or the DAE-like processor, for a program executed by the DAE processor or the DAE-like processor, when the program is written or compiled, a synchronization instruction needs to be explicitly inserted between function instructions that belong to different processing units and between which data dependency (or referred to as a data dependency relationship) exists, to avoid a disorder phenomenon when different processing units execute the function instructions of different function types in the parallel manner.

The data dependency refers to a relationship between two function instructions that need to be processed by different processing units, and one function instruction can be executed only after the other function instruction is executed.

Serial dependency: Two function instructions need to be processed by a same processing unit and are executed by the same processing unit in a serial manner.

In this case, synchronization between two function instructions that belong to different processing units may be implemented by using a synchronization queue between two processing units, and an additional synchronization instruction needs to be inserted to complete enqueuing and dequeuing of a synchronization message. The synchronization instruction is usually implemented as two paired instructions. In this case, the synchronization instruction may also be referred to as a synchronization instruction pair. For example, the synchronization instruction pair may include an enqueue (push) instruction and a dequeue (pop) instruction.

The push instruction is used to indicate to write the synchronization message to the synchronization queue, and is usually executed by a synchronized processing unit. The push instruction is usually inserted after a synchronized function instruction. One processing unit executes function instructions in the serial manner. Therefore, when the push instruction is executed, it means that the synchronized function instruction before the push instruction has been executed. In this specification, the push instruction may be represented as push(x, y), where x represents an identification of the synchronized processing unit, and y represents an identification of a synchronizing processing unit. For example, it is assumed that the synchronized processing unit is the computing processing unit and the synchronizing processing unit is the data access processing unit, and the push instruction may be represented as push(E, A). Alternatively, it is assumed that the synchronized processing unit is the data access processing unit and the synchronizing processing unit is the computing processing unit, and the push instruction may be represented as push (A, E).

The pop instruction is used to indicate to obtain the synchronization message from the synchronization queue, and is usually executed by the synchronizing processing unit. The pop instruction is usually inserted before a to-be-synchronized function instruction. When the queue is empty, the synchronizing processing unit is blocked and waits until the synchronized processing unit writes the synchronization message. Therefore, after the pop instruction is executed, it means that the push instruction corresponding to the pop instruction has been executed. One processing unit executes function instructions in the serial manner. Therefore, when a synchronizing function instruction is executed, the pop instruction, the push instruction corresponding to the pop instruction, and the synchronized function instruction are all executed. In this way, synchronization between the synchronized function instruction and the synchronizing function instruction is implemented. In this specification, the pop instruction may be represented as pop(x, y), where x represents the identification of the synchronized processing unit, and y represents the identification of the synchronizing processing unit. For example, it is assumed that the synchronized processing unit is the computing processing unit and the synchronizing processing unit is the data access processing unit, the pop instruction may be represented as pop(E, A). Alternatively, it is assumed that the synchronized processing unit is the data access processing unit and the synchronizing processing unit is the computing processing unit, the pop instruction may be represented as pop(A, E).

Backus-Naur form (Backus-Naur Form, BNF) is a formal symbol used to describe a syntax for defining a specific programming language. Generally, the programming language may include syntax structures such as a sequential structure, a loop structure, and a branch structure. In this specification, these syntax structures may be defined based on the BNF. Other code described in similar syntax can be deduced by analogy in the BNF, and details are not described. A BNF syntax is as follows:

```
block := stmt+                        ; sequential structure
stmt := for (Expr) block              ; loop structure
      | if (Expr) block               ; branch structure (without else)
      | if (Expr) block else block    ; branch structure (with else)
      | insn                          ; single function instruction that
can be executed by a specific processing unit
```

In a conventional technology, a synchronization instruction pair may be inserted between adjacent function instructions. For example, the following shows a program that has a sequential structure:

```
x = load (0x100)      //S1
x = x + 1             //S2
y = load(0x200)       //S3
y = y + x             //S4
```

The statements S1 and S3 each correspond to a data loading instruction, and need to be executed by the data access processing unit. The statements S2 and S4 each correspond to a logical computing instruction, and need to be executed by the computing processing unit. S2 depends on S1, and S4 depends on S2 and S3. A synchronization instruction pair is inserted between S1 and S2, a synchronization instruction pair is inserted between S2 and S3, and a synchronization instruction pair is inserted between S3 and S4. A program into which the synchronization instruction pairs are inserted is as follows:

```
x = load (0x100)      //S1
push(A,E)
pop(A,E)
x = x + 1             //S2
push(E,A)
pop(E,A)
y = load(0x200)       //S3
push(A,E)
pop(A,E)
y = y + x             //S4
```

Based on the foregoing program into which the synchronization instruction pairs are inserted, FIG. 1 is a schematic diagram of an instruction sequence execution time sequence according to the prior art. It can be learned from the instruction sequence execution time sequence that the data access processing unit and the computing processing unit execute statements according to an arrangement sequence of the statements. To be specific, the data access processing unit first executes the statement S1, and then executes the statement push(A, E). Then, the computing processing unit executes the statement pop(A, E), and then executes the statement S2 and the statement push(E, A). Then, the data access processing unit executes the statement pop(E, A), the statement S3, and the statement push(A, E). Then, the computing processing unit executes the statement pop(A, E) and the statement S4. In this way, after the synchronization instruction pairs are inserted, S2 depends on S1, and S4 depends on S2 and S3.

For a program that has a loop structure, a loop body may need to be executed repeatedly. To be specific, in a next loop, a first statement of the loop body needs to be executed after a last statement of the loop body is executed. Therefore, a synchronization instruction pair needs to be inserted between the last statement of the loop body and the first statement of the loop body. To be specific, the push instruction is inserted after the last statement, and the pop instruction is inserted before the first statement. In addition, the push instruction and the pop instruction need to appear in pairs, and the push instruction needs to be executed before the pop instruction. Therefore, for the pop instruction inserted before the first statement, an additional push instruction is added for pairing (which may be referred to as push pairing below) before a first loop. For the push instruction inserted after the last statement, a pop instruction is added for pairing (which may be referred to as pop pairing below) after a last loop.

For example, the following shows a program that has a loop structure:

```
for (i=0; i<n; i++) {
    x = load (0x100)   //S1
    x = x + 1          //S2
}
```

S1 corresponds to the data loading instruction, and needs to be executed by the data access processing unit. S2 corresponds to the logical computing instruction, and needs to be executed by the computing processing unit. S2 depends on S1. The synchronization instruction pair is inserted between S1 and S2, the pop instruction is inserted before S1, the push instruction is inserted after S2, and then the synchronization instructions are paired. A program into which the synchronization instruction pair is inserted is as follows:

```
push(E, A) //push pairing
for (i=0; i<n; i++) {
pop(E, A)
x = load (0x100)          //S1
push(A, E)
pop(A, E)
x = x + 1                 //S2
push(E, A)
}
pop(E, A)   //pop pairing
```

For a program that has a branch structure, in a program execution process, it is uncertain which branch statement is to be executed. Therefore, a synchronization instruction pair needs to be inserted at an external boundary of the branch structure. In this way, it is ensured that the push instruction and the pop instruction can always be paired.

For example, the following shows a program that has a branch structure:

```
x = load (0x100)          //S1
If (cond) {
x = x + 1                 //S2
}
store(x, 0x200)           //S3
```

The statements S1 and S3 each correspond to the data loading instruction, and need to be executed by the data access processing unit. S2 corresponds to the logical computing instruction, and needs to be executed by the computing processing unit. S2 depends on S1, and S3 depends on S1 and S2. Synchronization instruction pairs are inserted at an external boundary of the branch structure. A program into which the synchronization instruction pairs are inserted is as follows:

```
x = load (0x100)          //S1
push(A, E)
pop(A, E)
If (cond) {
x = x + 1                 //S2
}
push(E, A)
pop(E, A)
store(x, 0x200)           //S3
```

According to the foregoing method, the synchronization instruction can be inserted between the function instructions processed by different processing units, to avoid the disorder phenomenon when different processing units execute the function instructions of different function types in the parallel manner. However, after the synchronization instruction pair is inserted by using the foregoing method, function instructions that can be executed in parallel may be degraded to be executed in series due to existence of indirect dependency, and a hardware capability of parallel execution of the DAE processor or the DAE-like processor cannot be fully utilized. For example, in the foregoing program that has a sequential structure, the statements S2 and S3 may be executed in parallel. After the synchronization instruction pair is inserted by using the foregoing method, a parallel capability between the statements S2 and S3 is lost, and the statements S2 and S3 need to be executed in series.

It should be noted that program code of a to-be-inserted synchronization instruction pair may be considered as a program block (block) including one or more statements. The statement may be a compound statement (for example, a loop statement or a branch statement), and the loop statement or the branch statement is nested in a subprogram block. For example, if the statement is the loop statement, the loop statement includes a loop body. If the statement is the branch statement, the branch statement includes a branch body.

This application provides a synchronization instruction insertion method. The method includes: after a first program block including one or more statements is obtained, determining a first function instruction and a second function instruction between which data dependency exists in the first program block, and inserting a synchronization instruction pair between a statement to which the first function instruction belongs and a statement to which the second function instruction belongs. Each of the one or more statements includes one or more function instructions. The first function instruction and the second function instruction may be any two function instructions in the first program block. In this way, the synchronization instruction pair is automatically inserted between the function instructions based on the data dependency between the function instructions, so that parallelism between the function instructions can be effectively improved. This improves processing performance of a DAE processor or a DAE-like processor in processing the function instructions. The synchronization instruction insertion method provided in this application may be applicable to a device including a DAE processor or a DAE-like processor.

Figure 2:
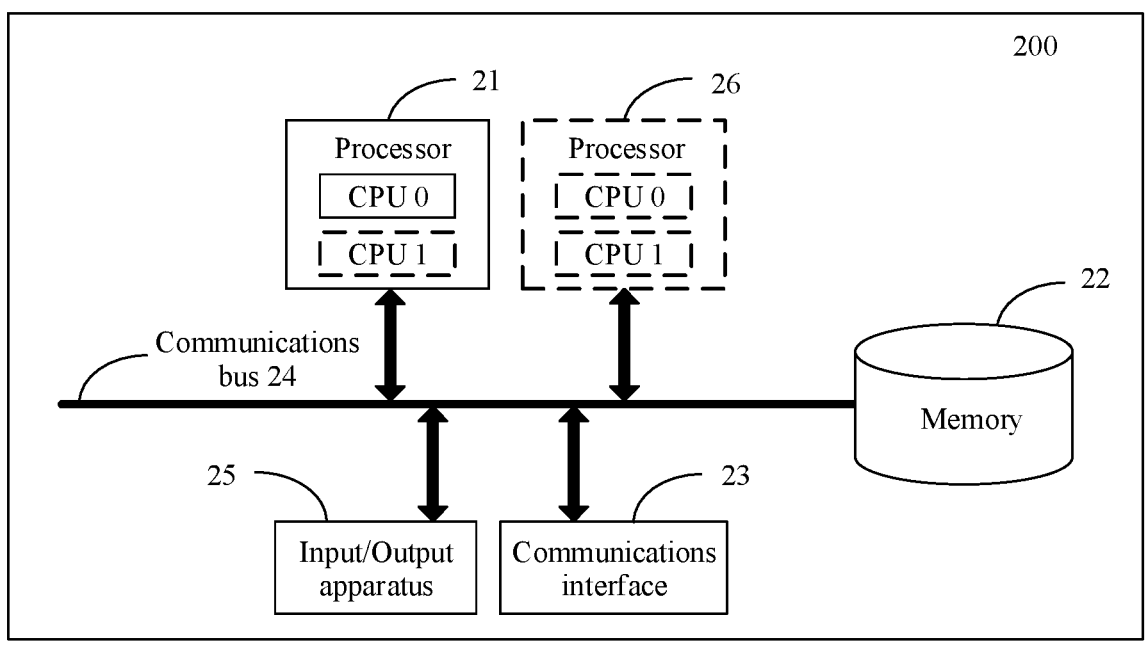
FIG. 2 is a schematic composition diagram of a computer device according to an embodiment of this application.

FIG. 2 is a schematic composition diagram of a computer device 200 according to an embodiment of this application. The computer device 200 may be an apparatus including a DAE processor or a DAE-like processor, or an apparatus that supports a computer device including a DAE processor or a DAE-like processor in implementing the synchronization instruction insertion method. For example, the computer device 200 may be a chip system. In this embodiment of this application, the chip system includes one or more chips, or may include a chip and another discrete device. As shown in FIG. 2, the computer device may include at least one processor 21, a memory 22, a communications interface 23, a communications bus 24, and an input/output apparatus 25.

Components of the computer device are specifically described in the following with reference to FIG. 2.

The processor 21 is a control center of the computer device, and may be one processor, or may be a collective name of a plurality of processing elements. In a specific implementation, in an embodiment, the processor 21 may include one or more central processing units (CPU), for example, a CPU 0 and a CPU 1 shown in FIG. 2. The processor 21 may alternatively be an application-specific integrated circuit (ASIC), or may be configured as one or more integrated circuits implementing the embodiments of this application, for example, one or more microprocessors (DSP) or one or more field programmable gate arrays (FPGA).

An example in which the processor 21 is the one or more CPUs is used. The processor 21 may perform various functions of the computer device by running or executing a software program stored in the memory 22 in the computer device and invoking data stored in the memory 22.

In a specific implementation, in an embodiment, the computer device may include a plurality of processors, for example, the processor 21 and a processor 26 shown in FIG. 2. Each of the processors may be a single-core processor (single-CPU) or may be a multi-core processor (multi-CPU). The processor herein may refer to one or more devices, circuits, and/or processing cores configured to process data (for example, a computer program instruction).

In this embodiment of this application, the processor is mainly configured to: after a first program block including one or more statements is obtained, determine that a first function instruction and a second function instruction between which data dependency exists in the first program block, and insert a synchronization instruction pair between a statement to which the first function instruction belongs and a statement to which the second function instruction belongs. Each of the one or more statements includes one or more function instructions. The first function instruction and the second function instruction may be any two function instructions in the first program block.

The memory 22 may be a read-only memory (ROM) or another type of static storage device that can store static information and an instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like), magnetic disk storage medium, another magnetic storage device, or any other medium that can be configured to carry or store expected program code in a form of an instruction or a data structure and that is accessible by a computer, but is not limited thereto. The memory 22 may exist independently, and is connected to the processor 21 through the communications bus 24. Alternatively, the memory 22 may be integrated into the processor 21.

The memory 22 is configured to store program code and the software program for executing the solutions of this application, and execution is controlled by the processor 21.

The communications interface 23 is configured to communicate with another device or a communications network, and the communications interface 23 may include a receiving unit for implementing a receiving function, and a sending unit for implementing a sending function.

The communications bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

The input/output apparatus 25 is configured to: obtain a program (or referred to as input code) from the memory 22, and transmit the input code to the processor; and transmit a program (output code) into which the synchronization instruction pair is inserted from the processor to the memory for storage. It should be noted that the program code is program source code that complies with a specific BNF syntax, an intermediate representation of a compiler, or the like.

A structure of the computer device shown in FIG. 2 does not constitute a limitation on the computer device. The computer device may include components more or fewer than those shown in the figure, or may combine some components, or may have a different component arrangement.

Optionally, after obtaining the program, the processor may convert the program into an abstract syntax tree (AST) (or referred to as a syntax tree (ST)), and insert the synchronization instruction pair into the program based on the abstract syntax tree. In the computer science, the abstract syntax tree is an abstract representation of a syntax structure of source code. The abstract syntax tree indicates a syntax structure of a programming language in a tree form. Each node on the tree indicates a structure or a single function instruction in the source code. A parent-child node relationship corresponds to a nested relationship between statements. A plurality of child nodes connected to a same parent node are sequential statements. A syntax is "abstract" because it does not represent every detail of a real syntax. For example, nested parentheses are hidden in a tree structure and are not presented in a node form. A conditional jump statement similar to "if-condition-then" can be represented by a node with two branches.

For example, the following program is a program including a loop statement, and a loop body includes a branch statement.

```
for (i=0; i<n; i++) {
    x[i] = load (0x100)          //S1
    if (cond) {
        x[i] = x[i] + 1          //S2
    }
    store(x[i], 0x200)           //S3
}
```

Figure 3A:
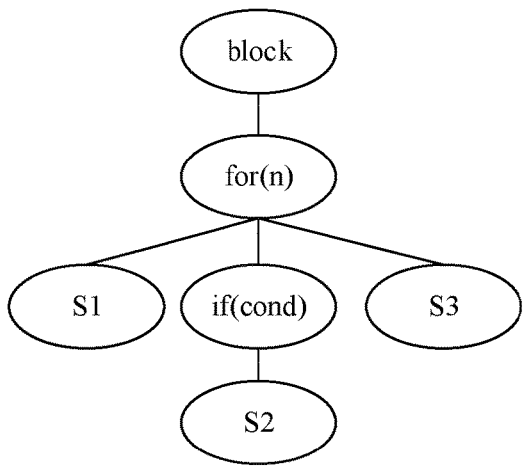
FIG. 3(a) and FIG. 3(b) are a schematic diagram of an abstract syntax tree structure according to this application.

The program is converted into an abstract syntax tree, as shown in FIG. 3(a). A node "block", a node "for(n)" and a node "if(cond)" are respectively parent nodes. The node "for(n)" is a child node of the node "block". A node "S1", the node "if(cond)" and a node "S3" are respectively child nodes of the node "for(n)". A node "S2" is a child node of the node "if(cond)".

Figure 3B:
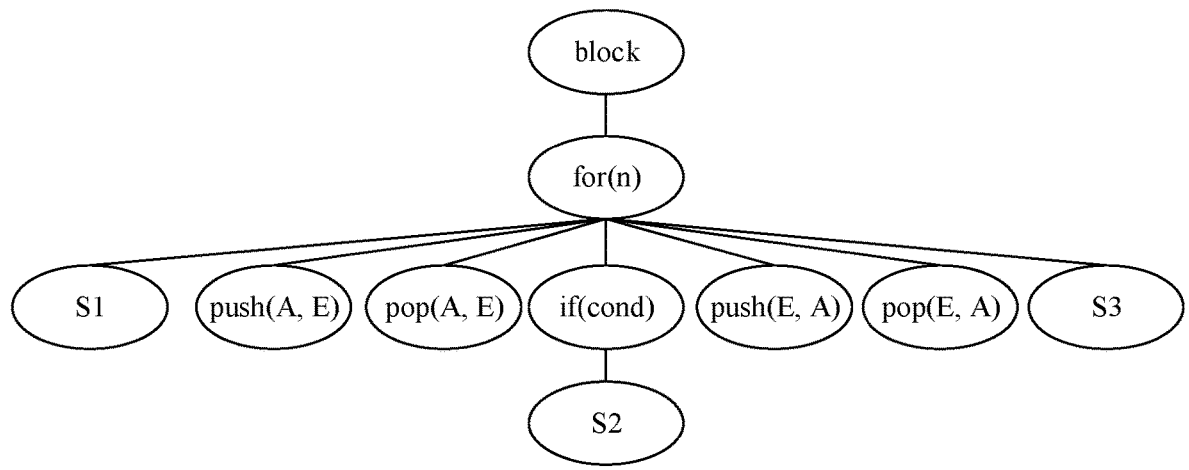

Then, on the abstract syntax tree, starting from a root node (the node "block"), a synchronization instruction node is successively inserted between child nodes connected to each parent node in a depth recursion manner based on each non-child node (parent node). S2 depends on S1, and S3 depends on S2. As shown in FIG. 3(b), a synchronization instruction node is inserted between the node "S1" and the node "if(cond)", and a synchronization instruction node is inserted between the node "if(cond)" and the node "S3". There is no dependency between the statement S3 and the statement S1. Therefore, there is no need to insert a reverse synchronization instruction pair between the statement S3 and the statement S1.

Then, corresponding output code is generated based on the abstract syntax tree into which the synchronization instruction nodes are inserted.

Figure 4:
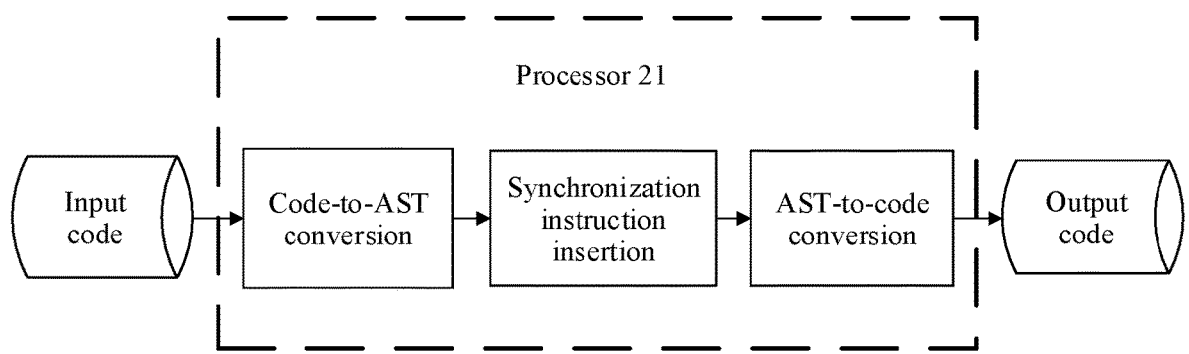
FIG. 4 is a schematic diagram of a logical structure of system running according to this application.

FIG. 4 is a schematic diagram of a logical structure of system running according to this application. An input/output apparatus 25 reads input code from a memory 22, and transmits the input code to a processor 21 through a communications bus 24. The processor 21 converts the input code into an abstract syntax tree, and inserts a synchronization instruction node based on the abstract syntax tree. The abstract syntax tree is a recursive structure, and each recursive node is included as a node "block". Therefore, synchronization instruction nodes may be inserted layer by layer from bottom to top in a depth recursion manner. Then, the abstract syntax tree into which the synchronization instruction nodes are inserted is converted into output code. The processor 21 transmits the output code to the input/output apparatus 25, and then the input/output apparatus 25 writes the output code into the memory 22.

The following uses the first program block as an example to describe in detail implementations of the synchronization instruction insertion method provided in this application with reference to the accompanying drawings. It is assumed that the first program block includes n statements, where n is an integer, n is greater than or equal to 1, and n indicates a quantity of statements included in the first program block. Each of the n statements includes one or more function instructions. After the first program block starts to be executed, it may be considered by default that the block enters, and the n statements are traversed. Each of the n statements may be processed according to the synchronization instruction insertion method provided in the embodiment of this application. After each of the n statements is traversed, it indicates that execution of the block ends.

Figure 5:
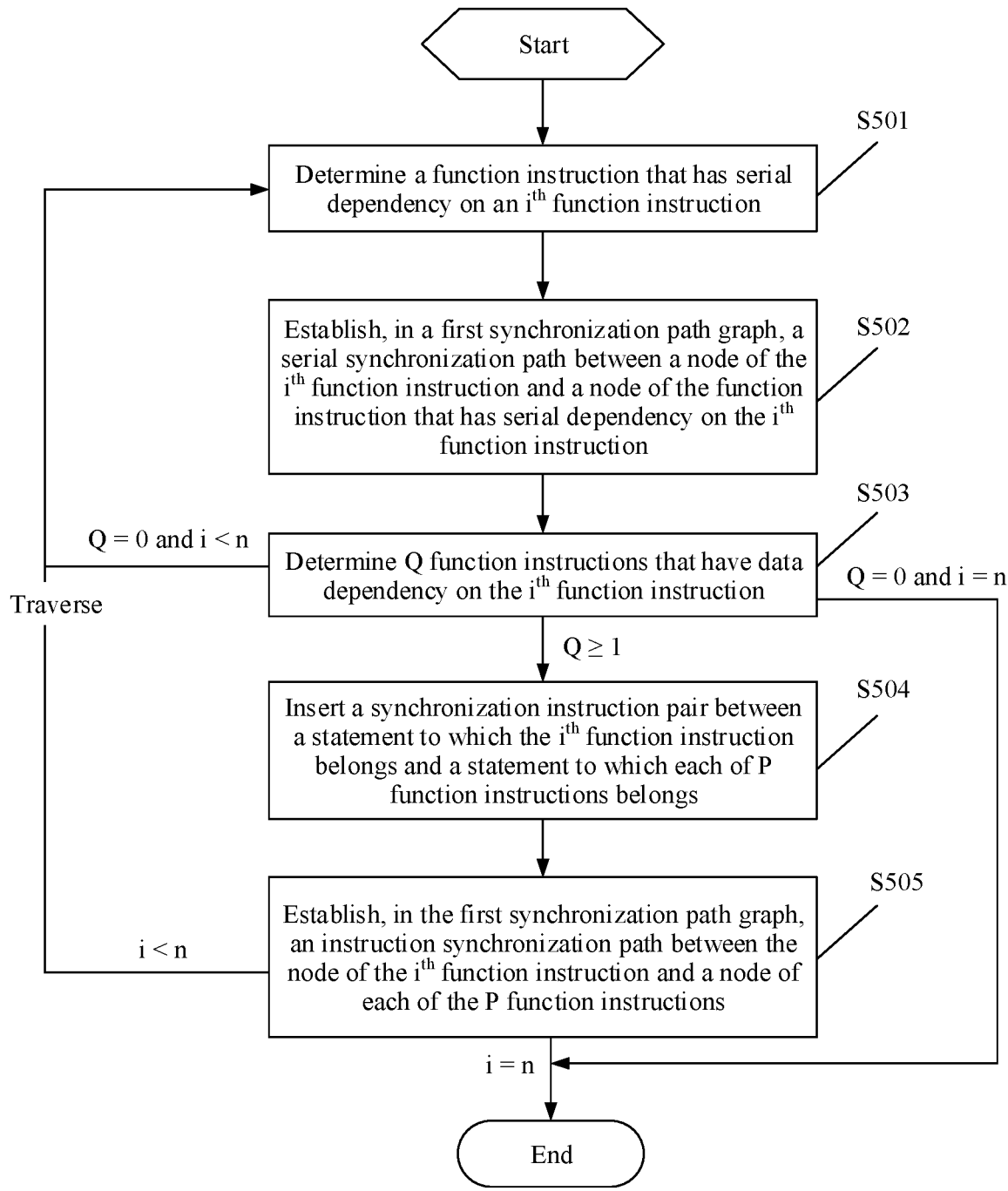
FIG. 5 is a flowchart of a synchronization instruction insertion method according to an embodiment of this application.

In a first possible design, the first program block is a program that has a sequential structure. Each of the n statements included in the first program block may be a single function instruction. The following uses an $i^{th}$ function instruction in the first program block as an example to describe a synchronization instruction insertion process, where i is an integer, and $i \in [1, n]$. It may be understood that the $i^{th}$ function instruction is a currently traversed function instruction. FIG. 5 is a flowchart of a synchronization instruction insertion method according to an embodiment of this application. The method may include the following steps.

S501: Determine a function instruction that has serial dependency on the $i^{th}$ function instruction.

In some embodiments, statements in the first program block are traversed along a first direction starting from the $i^{th}$ function instruction, to determine the function instruction that has serial dependency on the $i^{th}$ function instruction. Two function instructions between which serial dependency exists are executed by a same processing unit in a serial manner.

In some embodiments, if the $i^{th}$ function instruction is the first function instruction in the first program block, it indicates that there is no function instruction that can be traversed along the first direction starting from the first function instruction. Certainly, a function instruction that has serial dependency on the first function instruction is not determined.

In some other embodiments, if a function instruction arranged along the first direction starting from the $i^{th}$ function instruction and the $i^{th}$ function instruction are executed by different processing units, it indicates that there is no serial dependency between the function instruction arranged along the first direction starting from the $i^{th}$ function instruction and the $i^{th}$ function instruction. Certainly, the function instruction that has serial dependency on the $i^{th}$ function instruction is not determined.

If the function instruction that has serial dependency on the $i^{th}$ function instruction is determined, S502 is performed.

S502: Establish, in a first synchronization path graph, a serial synchronization path between a node of the $i^{th}$ function instruction and a node of the function instruction that has serial dependency on the $i^{th}$ function instruction.

This application provides a first synchronization path graph. The first synchronization path graph is a dynamically maintained graph used to express a directed dependency relationship between synchronized function instructions. The first synchronization path graph may be referred to as a global forward synchronization path graph. Nodes in the graph indicate function instructions, and a connecting line between the nodes indicates a synchronization path. The synchronization path herein includes a serial synchronization path and an instruction synchronization path.

A same processing unit executes two adjacent function instructions in the serial manner. Therefore, it may be considered that serial dependency naturally exists the two adjacent function instructions processed by the same processing unit. In this case, the serial synchronization path may be a connecting line between nodes of the two adjacent function instructions processed by the same processing unit.

The instruction synchronization path may be a connecting line of nodes of two function instructions that are processed by different processing units and between which data dependency exists.

In some embodiments, if it is determined that there is function instruction that has serial dependency on the $i^{th}$ function instruction, the node of the $i^{th}$ function instruction is added to the first synchronization path graph, and the serial synchronization path from the node of the function instruction that has serial dependency on the $i^{th}$ function instruction to the node of the $i^{th}$ function instruction is added.

In some other embodiments, if the function instruction that has serial dependency on the $i^{th}$ function instruction is not determined, only the node of the $i^{th}$ function instruction needs to be added to the first synchronization path graph. In this case, adding of the serial synchronization path from the node of the function instruction serially dependent on the $i^{th}$ function instruction to the node of the $i^{th}$ function instruction is not involved. For example, if the $i^{th}$ function instruction is the first function instruction in the first program block, it indicates that there is no function instruction that can be traversed along the first direction starting from the first function instruction. Certainly, the function instruction that has serial dependency on the first function instruction is not determined.

S503: Determine Q function instructions that have data dependency on the function instruction.

In some embodiments, the statements in the first program block may be traversed along the first direction starting from the $i^{th}$ function instruction, to determine the Q function instructions that have data dependency on the $i^{th}$ function instruction, where Q is an integer.

First directions may also be different based on different traversal directions of the statements in the first program block.

For example, when the traversal direction of the statements in the first program block is a direction of an arrangement sequence of the statements included in the first program block, the first direction may be an opposite direction of the direction of the arrangement sequence of the statements included in the first program block.

For another example, when the traversal direction of the statements in the first program block is an opposite direction of a direction of an arrangement sequence of the statements included in the first program block, the first direction may be the direction of the arrangement sequence of the statements included in the first program block.

For ease of description, the following provides description by using an example in which the first direction is the opposite direction of the direction of the arrangement sequence of the statements included in the first program block, and a second direction is the direction of the arrangement sequence of the statements included in the first program block.

In some embodiments, whether data dependency exists between any two function instructions may be determined based on performing read-after-write, write-after-read, write-after-write, and the like on a same block of memory data.

For example, for two function instructions I1 and I2, if one of the following conditions is met, it is considered that data dependency exists between I1 and I2.

(1) I1 and I2 access data at a same address, and at least one of I1 and I2 updates the memory data.

(2) Address ranges of data accessed by I1 and I2 overlap, and at least one of I1 and I2 updates data in an overlapping part.

(3) I1 and I2 have another potential dependency condition. For example, data needs to be transferred between I1 and I2 by using shared storage space.

The following uses a code example to describe how to determine whether data dependency exists between function instructions. For ease of description, in the following example, a memory access range tag is used for definition.

Memory access range: M (element type, element offset, and a quantity of accessed elements). The element type is a type of consecutive data elements existing in the access range. For example, float16 represents a floating-point type with a length of 16 bits. The element offset/quantity of accessed elements is determined based on an element type length.

The code example is as follows:

| set_round_mode(round_to_nearest) | //S1: Set a floating point |
| rounding mode | |
| vector_sqrt(M(float16,100,100), M(float16,0,100)) | //S2: Sqrt of vector data |
| element by element | |
| vector_sqrt(M(float16,200,100), M(float16,100,100)) | //S3: Sqrt of vector data |
| element by element | |
| vector_set(M(float16,0,600), 0) | //S4: Clear the vector data |
| element by element | |

In the preceding example, the instruction S1 is used to set a rounding mode for floating-point calculation. Corresponding hardware writes the mode to a special register.

The instruction S2 is used to perform sqrt on 100 pieces of f16 data in M(float 16,0,100) element by element, and then writes data after sqrt is performed on into M(f16,100, 100).

The instruction S3 is used to perform sqrt on 100 pieces of f16 data in M(f16,100,100) element by element, and then writes data after sqrt is performed on into M(f16,200,100).

The instruction S4 is used to separately clear 600 elements in M(f16,0,600).

Figure 5A:
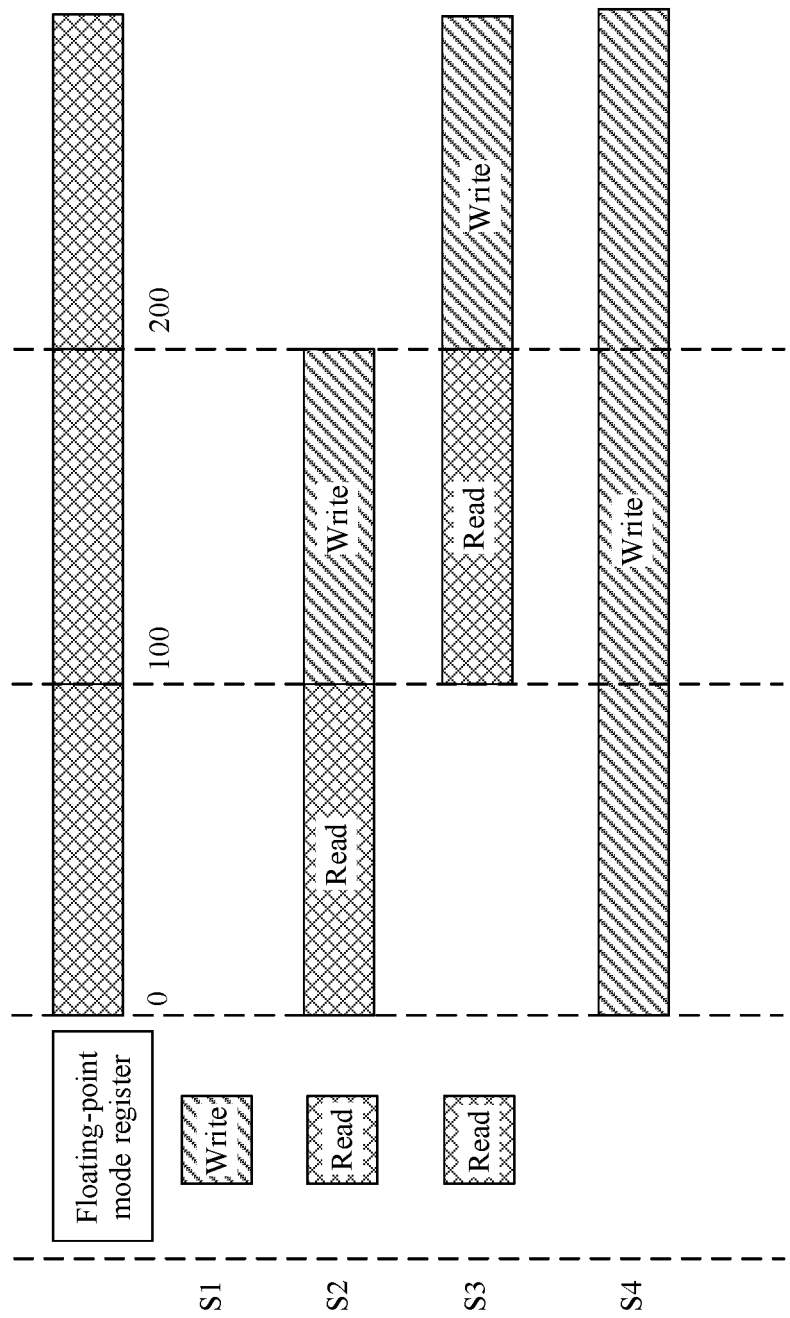
FIG. 5A is a schematic diagram of a process in which a function instruction accesses a memory range according to this application.

FIG. 5A shows a process of accessing a memory range by using the foregoing instructions. Based on this, a data dependency relationship between the instructions may be determined as follows:

(1) Both S2 and S3 depend on an identifier that is set by S1 and that is stored in the register for calculation. Therefore, S2 and S3 depend on S1.

(2) A read range of S3 overlaps with a write range M of S2. Therefore, S3 depends on S2.

(3) A write address of S4 and a read address of S2 are both 0, and a write range of S4 overlaps with a read/write range of S2. Therefore, S4 depends on S2.

(4) The write range M of S4 overlaps with the read range and a write range of S3 respectively. Therefore, S4 depends on S3.

It should be noted that, determining whether data dependency exists between any two function instructions may be performed in a process of traversing the function instructions in the first program block along the first direction starting from the $i^{th}$ function instruction. Certainly, the data dependency between any two function instructions in the first program block may be analyzed by using the foregoing method before the function instructions in the first program block are traversed. Then, information about the function instructions between which the data dependency exists and that are in the first program block is stored. This is not limited in this application.

Particularly, if Q=0, it indicates that the function instruction that has data dependency on the $i^{th}$ function instruction is not determined. In this case, no synchronization instruction pair needs to be inserted. For example, if the $i^{th}$ function instruction is the first function instruction in the first program block, it indicates that there is no function instruction that can be traversed along the first direction starting from the first function instruction. Certainly, the function instruction that has data dependency on the first function instruction is not determined. For another example, if both the function instruction arranged along the first direction starting from the $i^{th}$ function instruction and the $i^{th}$ function instruction are executed by a same processing unit, it indicates that serial dependency exists between the function instruction arranged along the first direction starting from the $i^{th}$ function instruction and the $i^{th}$ function instruction. Certainly, the function instruction that has data dependency on the $i^{th}$ function instruction is not determined.

In some embodiments, when Q=0 and i=n, it indicates that the $i^{th}$ function instruction is a last function instruction in the first program block, and the function instruction that has data dependency on the $i^{th}$ function instruction is not determined. In this case, execution of the first program block ends.

In some other embodiments, when Q=0 and i<n, it indicates that the $i^{th}$ function instruction is not the last function instruction in the first program block. In this case, i is incremented by 1, and another function instruction in the first program block continues to be traversed along the second direction. For details, refer to details in S501 to S505.

When Q is greater than or equal to 1, it indicates that the function instruction that has data dependency on the $i^{th}$ function instruction is determined, and S504 is performed.

S504: Insert a synchronization instruction pair between a statement to which the $i^{th}$ function instruction belongs and a statement to which each of P function instructions belongs.

In this embodiment of this application, each statement in the first program block is a single function instruction, and a synchronization instruction pair is inserted between the statement to which the $i^{th}$ function instruction belongs and a statement to which each of the Q function instructions belongs. It may also be understood as that the synchronization instruction pair is inserted between the $i^{th}$ function instruction and each of the Q function instructions.

In a possible implementation, the synchronization instruction pair may be inserted between the $i^{th}$ function instruction and each of the Q function instructions based on the first synchronization path graph.

For example, the first synchronization path graph may be queried to determine whether a path from a node of each of the Q function instructions to the node of the $i^{th}$ function instruction is reachable, so as to determine the P function instructions, in the Q function instructions, that have no synchronization relationship with the $i^{th}$ function instruction, where p is an integer, and $0 \leq P \leq Q$.

If a path from a node of the function instruction that has data dependency on the $i^{th}$ function instruction to the node of the $i^{th}$ function instruction is reachable, it indicates that synchronization has been established between the function instruction that has data dependency on the $i^{th}$ function instruction and the $i^{th}$ function instruction. For example, the path between the node of the function instruction that has data dependency on the $i^{th}$ function instruction and the node of the $i^{th}$ function instruction may be reachable by using the instruction synchronization path and the serial synchronization path.

If the path from the node of the function instruction that has data dependency on the $i^{th}$ function instruction to the node of the $i^{th}$ function instruction is unreachable, it indicates that the function instruction that has data dependency on the $i^{th}$ function instruction and the $i^{th}$ function instruction are not synchronized.

Particularly, if P=0, it indicates that a function instruction that has no synchronization relationship with the $i^{th}$ function instruction does not exist in the Q function instructions. This may also be understood as that the path from the node of each of the Q function instructions to the node of the $i^{th}$ function instruction is reachable. In this case, an insertion operation of the synchronization instruction pair does not need to be performed.

When P is greater than or equal to 1, it indicates that the function instruction that has no synchronization relationship with the $i^{th}$ function instruction exists in the Q function instructions, and a synchronization instruction pair is inserted between the $i^{th}$ function instruction and each of the P function instructions.

In some embodiments, the synchronization instruction pair includes a first synchronization instruction and a second synchronization instruction. The first synchronization instruction is a push instruction, and is used to write a synchronization message into a synchronization queue. The second synchronization instruction is a pop instruction, and is used to obtain the synchronization message from the synchronization queue.

In some embodiments, the push instruction may be inserted after the function instruction that has no synchronization relationship with the $i^{th}$ function instruction, and the pop instruction may be inserted before the $i^{th}$ function instruction.

Optionally, the synchronization instruction pair may be inserted between the $i^{th}$ function instruction and each of the P function instructions based on the opposite direction of the direction of the arrangement sequence of the statements included in the first program block. For example, the push instruction may be inserted after a function instruction, in the P function instructions, that is closest to the $i^{th}$ function instruction, and the pop instruction may be inserted before the $i^{th}$ function instruction. Then, the push instruction is inserted after a function instruction, in the P function instructions, that is the second closest to the $i^{th}$ function instruction, and the pop instruction is inserted before the pop instruction inserted before the $i^{th}$ function instruction. A process of inserting the synchronous instruction pair between the $i^{th}$ function instruction and each of the P function instructions is completed by analogy.

In some embodiments, when P=0 and i=n, it indicates that the $i^{th}$ function instruction is the last function instruction in the first program block, and the function instruction that has no synchronization relationship with the $i^{th}$ function instruction does not exist in the Q function instructions. In this case, execution of the first program block ends.

In some other embodiments, when P=0 and i<n, it indicates that the $i^{th}$ function instruction is not the last function instruction in the first program block. In this case, the other function instructions in the first program block continue to be traversed along the second direction. For details, refer to details in S501 to S505.

Therefore, function instructions for which the synchronization relationship has been established is dynamically maintained by using the first synchronization path graph, and reference is made before a new synchronization instruction is inserted. If a path between statements is reachable, no synchronization instruction pair needs to be inserted. This eliminates redundant synchronization, and effectively improves parallelism between the function instructions.

S505: Establish, in the first synchronization path graph, an instruction synchronization path between the node of the $i^{th}$ function instruction and a node of each of the P function instructions.

The instruction synchronization path from the node of each of the P function instructions to the node of the $i^{th}$ function instruction is added to the first synchronization path graph.

It should be noted that, if the path from the node of the function instruction that has data dependency on the $i^{th}$ function instruction to the node of the $i^{th}$ function instruction is reachable, it indicates that the function instruction that has data dependency on the $i^{th}$ function instruction and the $i^{th}$ function instruction are synchronized. For example, the path between the node of the function instruction that has data dependency on the $i^{th}$ function instruction and the node of the $i^{th}$ function instruction may be reachable by using the instruction synchronization path and the serial synchronization path. In this case, the first synchronization path graph does not need to be updated.

In some embodiments, when i=n, it indicates that the $i^{th}$ function instruction is the last function instruction in the first program block. In this case, execution of the first program block ends.

According to the synchronization instruction insertion method provided in this embodiment of this application, based on data dependency between function instructions processed by different processing units, a synchronization instruction pair is automatically inserted between function instructions for which no synchronization relationship is established, to establish synchronization between function instructions between which data dependency exists, so that parallelism between the function instructions can be effectively improved. This improves processing performance of a DAE processor or a DAE-like processor in processing the function instructions.

To express synchronization between statements (stmts or blocks) by using the first synchronization path graph, an entry function instruction set of the statement and an exit function instruction set of the statement first need to be defined. For each stmt or block, as long as a direct or indirect substatement of the stmt or block includes a function instruction processed by a processing unit, the stmt or block has an entry function instruction set and an exit function instruction set that belong to the processing unit. The processing unit may be a data access processing unit or a computing processing unit.

The entry function instruction set of the statement is a set of all function instructions that may be first executed by the processing unit after the statement is executed by the processing unit.

Specifically, if the statement has a loop structure, the entry function instruction set of the statement is an entry function instruction set of a loop body of the statement.

If the statement has a branch structure with else (else), the entry function instruction set of the statement is a union set of entry function instruction sets of a then (then) branch body and an else branch body.

If the statement has a branch structure without else, the entry function instruction set of the statement is an entry function instruction set of a then branch body.

If the statement has a block structure, traversal starts from a first statement of the block along the second direction, to a first statement S that includes the function instruction of the processing unit and that does not have a "branch structure". All statements from the first statement (including the first statement) of the block to the statement S (including the statement S) are in a union set of entry function instruction sets of the processing unit.

If the statement is a single function instruction, the entry function instruction set of the statement is a set constructed by using the function instruction as a unique element.

The exit function instruction set of the statement is a set of all function instructions that may be finally executed by the processing unit before the statement is exited by the processing unit.

Specifically, if the statement has a loop structure, the exit function instruction set of the statement is an exit function instruction set of a loop body of the statement.

If the statement has a branch structure with else, the exit function instruction set of the statement is a union set of exit function instruction sets of a then branch body and an else branch body.

If the statement has a branch structure without else, the exit function instruction set of the statement is an exit function instruction set of a then branch body.

If the statement has a block structure, traversal starts from the last statement of the block along the first direction, to the first statement S that includes the function instruction of the processing unit and that does not have a "branch structure". All statements from the statement S (including the statement S) to the last statement (including the last statement) of the block are in a union set of exit function instruction sets of the processing unit.

If the statement is a single function instruction, the exit function instruction set of the statement is a set constructed by using the function instruction as a unique element.

For the statements S1 and S2, when dependency is established between an exit function instruction set A of S1 and an entry function instruction set B of S2, it means that a synchronization path is added between each function instruction in A and each function instruction in B.

For example, a single statement is as follows:

```
x=0                                    //S1
```

The statement S1 is executed by the computing processing unit, and an entry function instruction set and the exit function instruction set of the statement S1 executed by the computing processing unit are both [S1].

For another example, a branch statement is as follows:

```
if (cond) {
    x = x + 1                          //S1
    store(x, 0x100)                    //S2
} else {
    x = x + 2                          //S3
    x = x *2                           // S4
}
```

An entry function instruction set of the branch statement if(cond) executed by the computing processing unit is [S1, S3], and an exit function instruction set of the branch statement if(cond) executed by the computing processing unit is [S1,S4]. An entry function instruction set of the branch statement if(cond) executed by the data access processing unit is [S2], and an exit function instruction set of the branch statement if(cond) executed by the data access processing unit is [S2].

For another example, a block statement is as follows:

```
load(x, 0x200)                         //S1
if(cond) {
    x = x + 1                          //S2
}
x = x + 1                              //S3
store(x, 0x100)                        //S4
```

An entry function instruction set of the block statement executed by the computing processing unit is [S2,S3], and an exit function instruction set of the block statement executed by the computing processing unit is [S3]. An entry function instruction set of the block statement executed by the data access processing unit is [S1], and an exit function instruction set of the block statement executed by the data access processing unit is [S4].

For another example, a loop statement is as follows:

```
for (i) {
    load(x, 0x200)                     //S1
    if(cond) {
        x = x + 1                      //S2
    }
    x = x + 1                          //S3
    store(x, 0x100)                    //S4
}
```

An entry function instruction set of the loop statement executed by the computing processing unit is [S2,S3], and an exit function instruction set of the loop statement executed by the computing processing unit is [S3]. An entry function instruction set of the loop statement executed by the data access processing unit is [S1], and an exit function instruction set of the loop statement executed by the data access processing unit is [S4].

With reference to FIG. 6(a) to FIG. 6(c) and FIG. 7(a) to FIG. 7(e), the following describes, by using an example, a process of inserting a synchronization instruction pair into a program that has a sequential structure. As shown below, the program that has a sequential structure includes five statements (S1 to S5), and each statement is a single function instruction.

```
x = load (0x100)                       //S1
y = 10                                 //S2
```

```
z = x + y          //S3
store(z, 0x200)    //S4
store(y, 0x300)    //S5
```

The statement S1, the statement S4, and the statement S5 are processed by the data access processing unit. The statement S2 and the statement S3 are processed by the computing processing unit. Serial dependency exists between the statement S1, the statement S4, and the statement S5. Serial dependency exists between the statement S2 and the statement S3. Data dependency includes: the statement S3 depends on the statement S1 and the statement S2, the statement S4 depends on the statement S3, and the statement S5 depends on the statement S2.

Figure 6A:
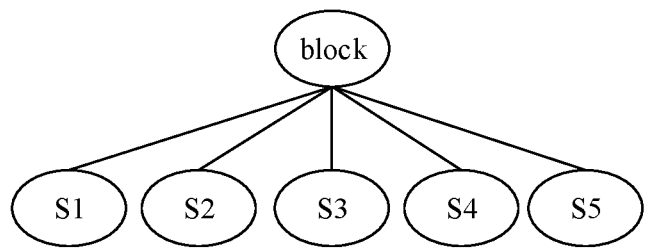
FIG. 6(a) to FIG. 6(c) are a schematic diagram of another abstract syntax tree structure according to this application.
Figure 6B:
Figure 6B:
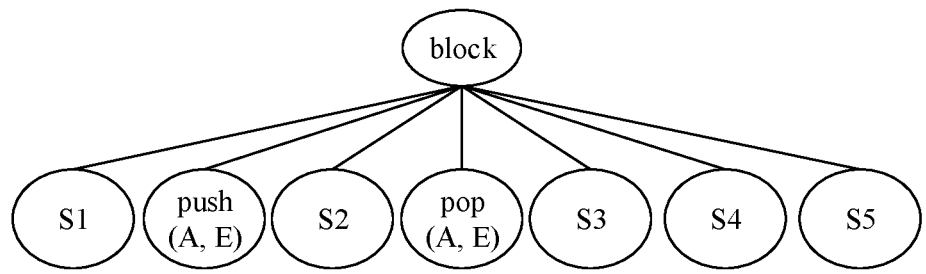

1. The program that has a sequential structure is converted into an abstract syntax tree, as shown in FIG. 6(a). A node "block" is a parent node, and a node "S1", a node "S2", a node "S3", a node "S4", and a node "S5" are child nodes of the node "block".

2. Five child nodes (S1 to S5) in the block are sequentially traversed and processed, and a process of inserting a synchronization instruction pair is executed.

Figure 7A:
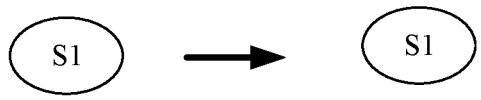
FIG. 7(a) to FIG. 7(e) are a schematic diagram of a first synchronization path graph according to this application.
Figure 7B:
Figure 7C:
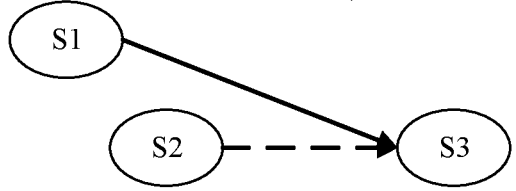
Figure 7D:
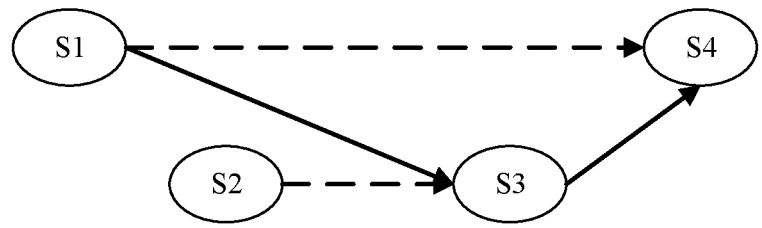
Figure 7E:
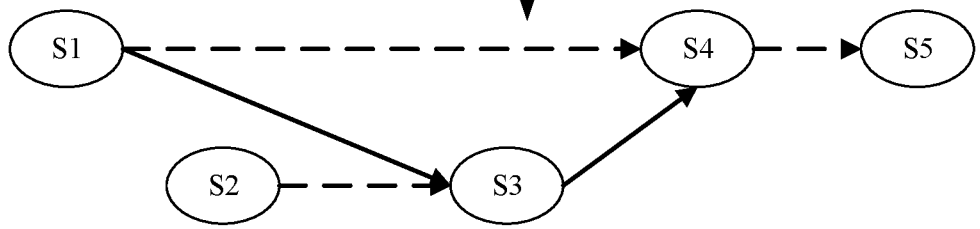

Node "S1": The node "S1" is added to the first synchronization path graph. Because the statement S1 is the first statement in the block, there is no statement that is in the block and that can be traversed along the first direction starting from the statement S1. Certainly, a function instruction that has serial dependency on the statement S1 is not determined. Therefore, adding of a serial synchronization path of the node "S1" is not involved. It may be understood that the statement S1 is an instruction in an entry function instruction set of the data access processing unit. Similarly, a function instruction that has data dependency on the statement S1 is not determined, no synchronization instruction pair needs to be inserted, and adding of an instruction synchronization path of the node "S1" is not involved. The abstract syntax tree is still as shown in FIG. 6(a), and does not need to be changed. A change of the first synchronization path graph is shown in FIG. 7(a).

The node "S2": The node "S2" is added to the first synchronization path graph. The statements in the block are traversed along the first direction starting from the statement S2, and a statement that has serial dependency on the statement S2 is not determined. Therefore, adding of a serial synchronization path of the node "S2" is not involved. It may be understood that the statement S2 is an instruction in an entry function instruction set of the computing processing unit. The statements in the block are traversed along the first direction starting from the statement S2, and a statement that has data dependency on the statement S2 is not determined, and no synchronization instruction pair needs to be inserted. Therefore, adding of an instruction synchronization path of the node "S2" is not involved. The abstract syntax tree is still as shown in FIG. 6(a), and does not need to be changed. The first synchronization path graph changes from FIG. 7(a) to FIG. 7(b).

The node "S3": The node "S3" is added to the first synchronization path graph. The statements in the block are traversed along the first direction starting from the statement S3, to determine the statement S2 that has serial dependency on the statement S3. A serial synchronization path from the node "S2" to the node "S3" is added to the first synchronization path graph. The statements in the block are traversed along the first direction starting from the statement S3, to determine the statement S1 that has data dependency on the statement S3. In addition, the first synchronization path graph is queried, to determine that a path from the node "S1" to the node "S3" is unreachable. A synchronization instruction pair is inserted between the statement S1 and the statement S3. To be specific, push(A, E) is inserted after the statement S1, pop(A, E) is inserted before the statement S3, and an instruction synchronization path from the node "S1" to the node "S3" is added to the first synchronization path graph. The abstract syntax tree changes from FIG. 6(a) to FIG. 6(b). The first synchronization path graph changes from FIG. 7(b) to FIG. 7(c).

The node "S4": The node "S4" is added to the first synchronization path graph. The statements in the block are traversed along the first direction starting from the statement S4, to determine the statement S1 that has serial dependency on the statement S4. A serial synchronization path from the node "S1" to the node "S4" is added to the first synchronization path graph. The statements in the block are traversed along the first direction starting from the statement S4, to determine the statement S3 that has data dependency on the statement S4. In addition, the first synchronization path graph is queried, to determine that a path from the node "S3" to the node "S4" is unreachable. A synchronization instruction pair is inserted between the statement S3 and the statement S4. To be specific, push(E, A) is inserted after the statement S3, pop(E, A) is inserted before the statement S4, and an instruction synchronization path from the node "S3" to the node "S4" is added to the first synchronization path graph. The abstract syntax tree changes from FIG. 6(b) to FIG. 6(c). The first synchronization path graph changes from FIG. 7(c) to FIG. 7(d).

Figure 6C:
Figure 6C:
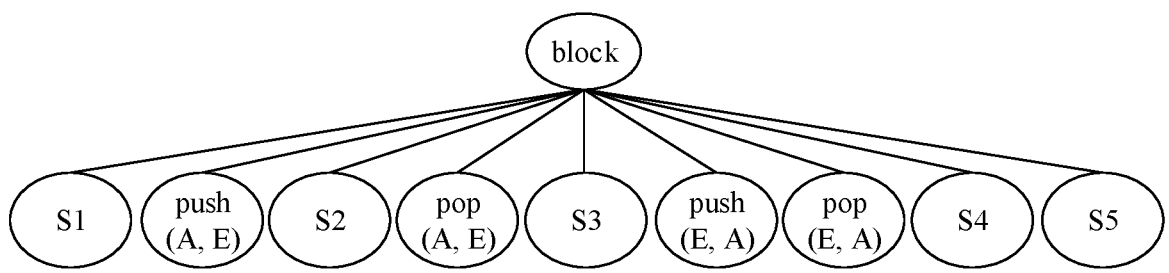

The node "S5": The node "S5" is added to the first synchronization path graph. The statements in the block are traversed along the first direction starting from the statement S5, to determine the statement S4 that has serial dependency on the statement S5. A serial synchronization path from the node "S4" to the node "S5" is added to the first synchronization path graph. The statements in the block are traversed along the first direction starting from the statement S5, to determine the statement S2 that has data dependency on the statement S5. In addition, the first synchronization path graph is queried, to determine that a path from the node "S2" to the node "S5" is reachable (S2→S3→S4→S5). Therefore, no additional synchronization instruction pair needs to be inserted, and adding of an instruction synchronization path from the node "S2" to the node "S5" is not involved. The abstract syntax tree is still as shown in FIG. 6(c), and does not need to be changed. The first synchronization path graph changes from FIG. 7(d) to FIG. 7(e).

3. The abstract syntax tree into which the synchronization instruction pairs are inserted is converted into a program that has a sequential structure and into which the synchronization instruction pairs are inserted. The program that has a sequential structure and into which the synchronization instruction pairs are inserted is as follows:

```
x = load (0x100)     //S1
push(A, E)
y = 10               //S2
pop(A, E)
z = x + y            //S3
push(E,A)
pop(E,A)
store(z, 0x200)      //S4
store(y, 0x300)      //S5
```

In a second possible design, the first program block may be a structure of a compound statement. For example, the compound statement is a branch statement (if), the n statements are statements in a branch structure, and each of the n statements may be a single function instruction. A difference from the first possible design lies in that, after synchronization is established for the statements in the branch structure, synchronization further needs to be established between the statement in the first program block and a statement outside the first program block. For details, refer to descriptions in the following related embodiments.

Figure 8A:
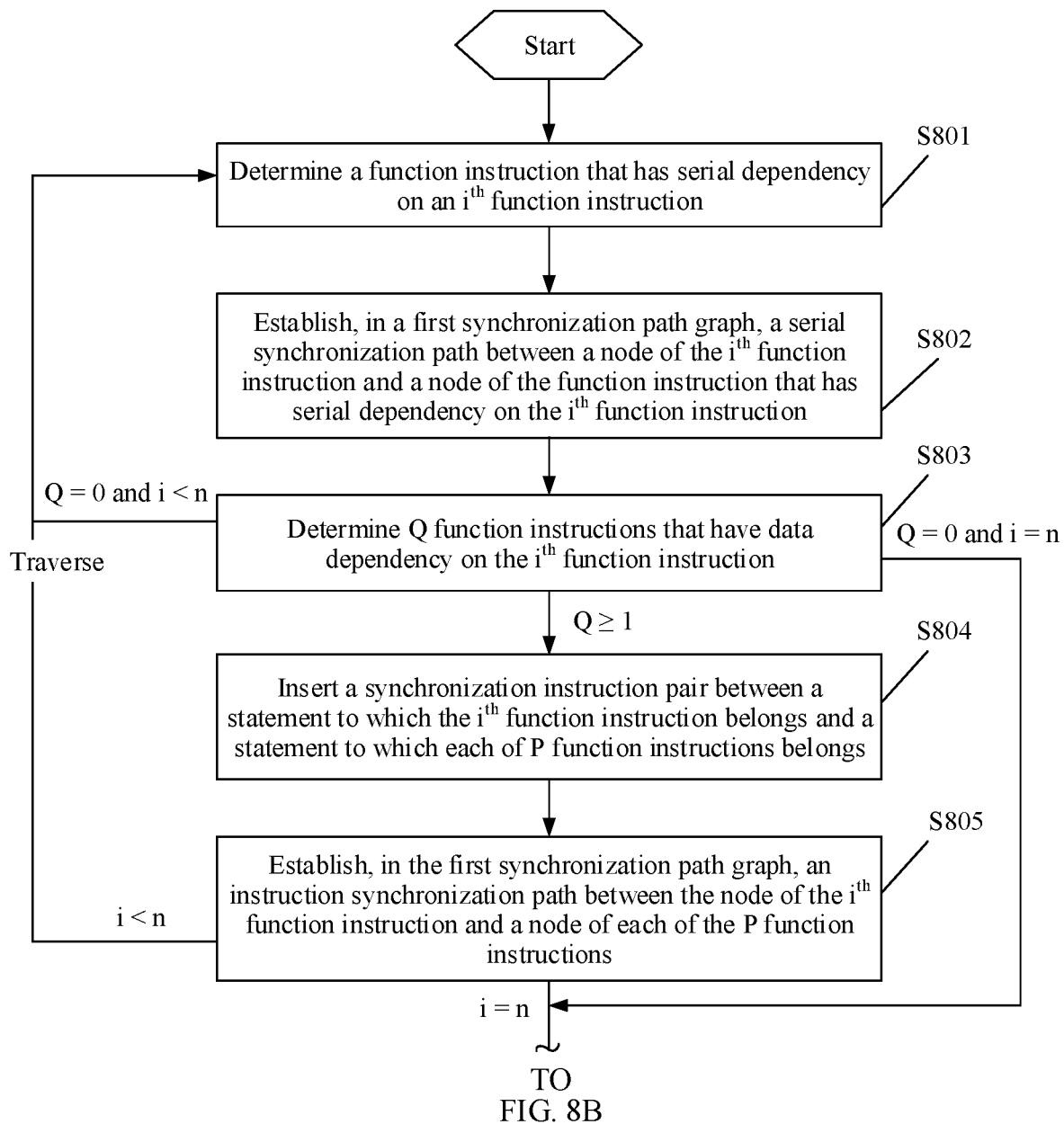
FIG. 8A and FIG. 8B are a flowchart of another synchronization instruction insertion method according to an embodiment of this application.
Figure 8B:
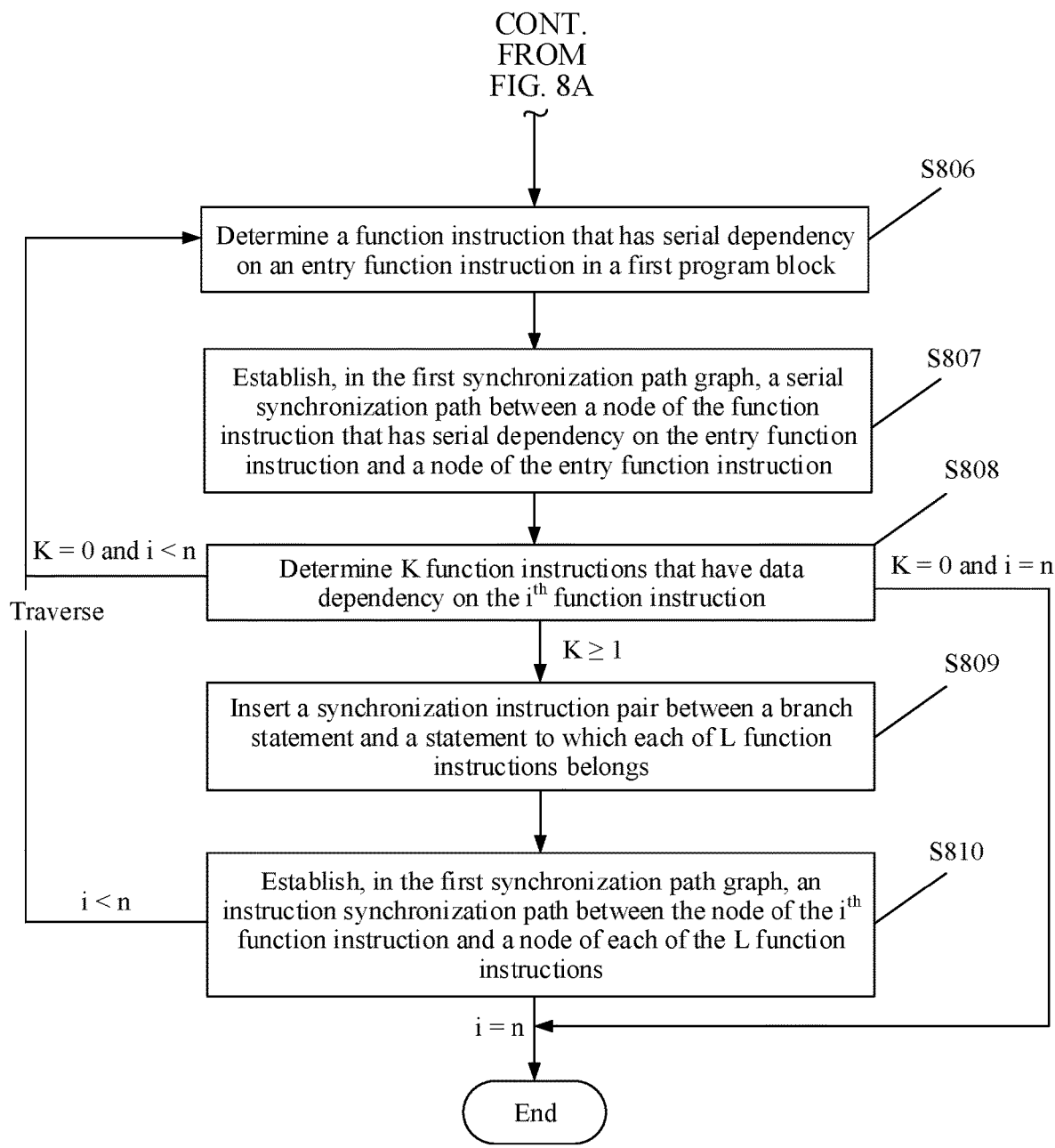

FIG. 8A and FIG. 8B are a flowchart of a synchronization instruction insertion method according to an embodiment of this application. As shown in FIG. 8A and FIG. 8B, the method may include the following steps.

S801: Determine a function instruction that has serial dependency on an $i^{th}$ function instruction.

In some embodiments, statements in the first program block are traversed along a first direction starting from the $i^{th}$ function instruction, to determine the function instruction that has serial dependency on the $i^{th}$ function instruction.

S802: Establish, in a first synchronization path graph, a serial synchronization path between a node of the $i^{th}$ function instruction and a node of the function instruction that has serial dependency on the $i^{th}$ function instruction.

For details, refer to the specific descriptions of S501 and S502. Details are not described again.

S803: Determine Q function instructions that have data dependency on the $i^{th}$ function instruction.

In some embodiments, the statements in the first program block may be traversed along the first direction starting from the $i^{th}$ function instruction, to determine the Q function instructions that have data dependency on the $i^{th}$ function instruction, where Q is an integer. For details, refer to the specific description of S503. Details are not described again.

It should be noted that the first program block has a branch structure. When Q=0 and i=n, it indicates that the $i^{th}$ function instruction is the last function instruction in the first program block, and the function instruction that has data dependency on the $i^{th}$ function instruction is not determined. In this case, S806 to S810 are performed.

When Q is greater than or equal to 1, it indicates that the function instruction that has data dependency on the $i^{th}$ function instruction is determined, and S804 is performed.

S804: Insert a synchronization instruction pair between a statement to which the $i^{th}$ function instruction belongs and a statement to which each of P function instructions belongs.

In a possible implementation, the synchronization instruction pair may be inserted between the $i^{th}$ function instruction and each of the Q function instructions based on the first synchronization path graph.

For example, the first synchronization path graph may be queried to determine whether a path from a node of each of the Q function instructions to the node of the $i^{th}$ function instruction is reachable, so as to determine the P function instructions, in the Q function instructions, that have no synchronization relationship with the $i^{th}$ function instruction, where p is an integer, and 0<P<Q.

For details, refer to the specific description of S504. Details are not described again.

It should be noted that the first program block has a branch structure. When P=0 and i=n, it indicates that the $i^{th}$ function instruction is the last function instruction in the first program block, and a function instruction that has no synchronization relationship with the $i^{th}$ function instruction does not exist in the Q function instructions. In this case, S806 to S810 are performed.

S805: Establish, in the first synchronization path graph, an instruction synchronization path between the node of the $i^{th}$ function instruction and a node of each of the P function instructions.

The instruction synchronization path from the node of each of the P function instructions to the node of the $i^{th}$ function instruction is added to the first synchronization path graph.

For details, refer to the specific description of S505. Details are not described again.

In some embodiments, when i=n, it indicates that the $i^{th}$ function instruction is the last function instruction in the first program block. In this case, S806 to S810 are performed.

In some other embodiments, when i<n, it indicates that the $i^{th}$ function instruction is not the last function instruction in the first program block. In this case, another statement in the first program block continues to be traversed along a second direction, and synchronization between the statement and a statement in the first program block along the first direction starting from the statement is established. For details, refer to details in S801 to S805.

S806: Determine a function instruction that has serial dependency on an entry function instruction in the first program block.

In some embodiments, a function instruction before a branch statement is traversed along the first direction starting from the branch statement, to determine the function instruction that has serial dependency on the entry function instruction in the first program block. Two function instructions between which serial dependency exists are executed by a same processing unit in a serial manner. If the function instruction that has serial dependency on the entry function instruction in the first program block is traversed, S807 is performed.

In this application, the entry function instruction may refer to entry function instructions of different processing units.

For example, the entry function instruction may be an instruction in an entry function instruction set executed by a data access processing unit. Specifically, a function instruction that is processed by the data access processing unit and that is before the branch statement is traversed along the first direction starting from the branch statement.

For another example, the entry function instruction set may alternatively refer to an instruction in an entry function instruction set executed by a computing processing unit. Specifically, a function instruction that is processed by the computing processing unit and that is before the branch statement is traversed along the first direction starting from the branch statement.

S807: Establish, in the first synchronization path graph, a serial synchronization path between a node of the function instruction that has serial dependency on the entry function instruction and a node of the entry function instruction.

The serial synchronization path from the node of the function instruction that has serial dependency on the entry function instruction to the node of the entry function instruction is added to the first synchronization path graph.

Specifically, for an entry function instruction of each non-idle processing unit in the branch statement, starting from the branch statement (excluding the branch statement), a statement processed by the non-idle processing unit in a second program block is searched for along the first direction, and the statement has a non-"branch structure". Then, for the traversed statement processed by each processing unit, a serial synchronization path from an exit function instruction set corresponding to the processing unit to an entry function instruction set corresponding to the processing unit in the branch statement is established.

S808: Determine K function instructions that have data dependency on the $i^{th}$ function instruction.

In some embodiments, the function instructions before the branch statement may be traversed along the first direction starting from the $i^{th}$ function instruction, to determine the K function instructions that have data dependency on the $i^{th}$ function instruction, where K is an integer. The K function instructions that have data dependency on the $i^{th}$ function instruction are statements outside the first program block.

Particularly, if K=0, it indicates that the function instruction that has data dependency on the $i^{th}$ function instruction is not determined. In this case, an insertion operation of the synchronization instruction pair does not need to be performed. For example, no other function instruction exists before the branch statement along the first direction starting from the $i^{th}$ function instruction. Certainly, the function instruction that has data dependency on the $i^{th}$ function instruction is not determined. For another example, if both the function instruction arranged along the first direction starting from the $i^{th}$ function instruction and the $i^{th}$ function instruction are executed by a same processing unit, it indicates that serial dependency exists between the function instruction arranged along the first direction starting from the $i^{th}$ function instruction and the $i^{th}$ function instruction. Certainly, the function instruction that has data dependency on the $i^{th}$ function instruction is not determined.

Optionally, the first program block may be further nested in the second program block, and statements that are in the second program block and are traversed along the first direction starting from the $i^{th}$ function instruction may include a compound statement. Therefore, the traversed statement may be a function instruction or a compound statement. After the statements in the second program block are traversed along the first direction starting from the $i^{th}$ function instruction, each of the traversed statements and the $i^{th}$ function instruction are analyzed, to determine whether data dependency exists between the traversed statement and the $i^{th}$ function instruction, or determine whether data dependency exists between a function instruction in the traversed statement and the $i^{th}$ function instruction, so as to determine the function instruction that has data dependency on the $i^{th}$ function instruction.

If a function instruction I1 exists in the traversed statement and a function instruction I2 exists in a current statement, a synchronization instruction pair is inserted between the traversed statement and the current statement. A synchronization path between an exit function instruction set of a processing unit corresponding to the function instruction I1 and an entry function instruction set of a processing unit corresponding to the function instruction I2 is established in the first synchronization path graph.

In some embodiments, if the function instruction that has no synchronization relationship with the $i^{th}$ function instruction is a function instruction in a compound statement, a push instruction may be inserted at the end of a structure body of the compound statement including the function instruction, and a pop instruction may be inserted before the $i^{th}$ function instruction.

For example, the function instruction I1 exists in the traversed statement, the function instruction I2 exists in the current statement, and I1 and I2 meet the following conditions.

(1) The function instruction I1 and the function instruction I2 are processed by different processing units.

(2) Data dependency exists between the function instruction I1 and the function instruction I2.

(3) In the first synchronization path graph, a path between a node of the function instruction I1 and a node of the function instruction I2 is unreachable.

In this case, a synchronization instruction pair needs to be inserted between the traversed statement to which the function instruction I1 belongs and the current statement to which the function instruction I2 belongs. For the function instruction I1 and the function instruction I2 that need to be synchronized between the traversed statement and the current statement, a push instruction is inserted after the traversed statement, and a pop instruction is inserted before the current statement.

For other specific explanations, refer to the descriptions of S503. Details are not described again.

When K is greater than or equal to 1, it indicates that the function instruction that has data dependency on the $i^{th}$ function instruction is determined, and S809 is performed.

S809: Insert a synchronization instruction pair between the branch statement and a statement to which each of L function instructions belongs.

In a possible implementation, the L function instructions that have no synchronization relationship with the $i^{th}$ function instruction and that are in the K function instructions may be determined based on the first synchronization path graph. L is an integer, and 0≤L≤K.

In some embodiments, if the function instruction that has no synchronization relationship with the $i^{th}$ function instruction is not the statement in the compound statement, the push instruction is inserted after the function instruction, and the pop instruction is inserted before the branch statement.

In some other embodiments, if the function instruction that has no synchronization relationship with the $i^{th}$ function instruction is the statement in the compound statement, the push instruction may be inserted at the end of the structure body of the compound statement including the function instruction, and the pop instruction may be inserted before the branch statement.

For other specific explanations, refer to the descriptions of S504. Details are not described again.

When L is greater than or equal to 1, it indicates that the function instruction that has no synchronization relationship with the $i^{th}$ function instruction exists in the K function instructions, and S810 is performed.

S810: Establish, in the first synchronization path graph, an instruction synchronization path between the node of the $i^{th}$ function instruction and a node of each of the L function instructions.

The instruction synchronization path from the node of each of the L function instructions to the node of the $i^{th}$ function instruction is added to the first synchronization path graph.

S806 to S810 describe a process of establishing synchronization between a statement in the branch statement and a statement before the branch statement.

Particularly, in some embodiments, the first program block may be a separate program block, and is not nested in another program block. In this case, S806 and S808 may be normally performed, but the function instruction that has serial dependency on the entry function instruction in the first program block and a function instruction that has data dependency on a function instruction in the first program block are not traversed. In this case, S807, S809, and S810 do not need to be performed.

In some other embodiments, the first program block may have a nested structure, and the first program block is nested in the second program block. Before the first program block, another statement in the second program block is included, and synchronization for the another statement in the second program block is established. For details, refer to the detailed descriptions of S806 to S810. Details are not described again. However, the another statement in the second program block is not included after the first program block. In this case, it indicates that execution of the second program block is completed, and after S810 is performed, another step does not need to be performed.

In some other embodiments, if the first program block has a nested structure, the first program block is nested in the second program block. However, another statement in the second program block is further included after the first program block. In this case, it indicates that execution of the second program block is not completed. After S810 is performed, for the another statement in the second program block, statements before the another statement in the second program block further need to be traversed along the first direction, to determine function instructions that have data dependency and serial dependency on the another function instruction in the second program block. For details, refer to the detailed descriptions of S501 to S505. Details are not described again. It should be noted that, if the function instruction that has no synchronization relationship with the $i^{th}$ function instruction is the statement in the compound statement, the push instruction may be inserted at the end of the structure body of the compound statement including the function instruction, and the pop instruction may be inserted before the current statement.

Particularly, in the first synchronization path graph, when nodes of two function instructions connected to any path are respectively located inside and outside the branch statement, the path may be referred to as a branch path. The branch path is a special synchronization path. When a source node of the branch path is located outside the branch statement, the branch path may be referred to as a branch entry path. When the source node of the branch path is located inside the branch statement, the branch path may be referred to as a branch exit path.

For any two nodes $N_s$ and $N_e$ in the first synchronization path graph, if there are m synchronization paths sequentially connected: $(N_s, N_1), (N_1, N_2), (N_2, N_3), \ldots, (N_{m-1}, N_e)$, and the m synchronization paths meet one of the following conditions, it is considered that the path from the $N_s$ to the $N_e$ is reachable:

(1) None of the m synchronization paths is a branch path.

(2) Among the m synchronization paths, there are n branch paths in sequence: $(P_1, P_2), (P_3, P_4), \ldots,$ and $(P_{2xn-1}, P_{2xn})$. For any branch entry path $(P_s, P_{s+1})$, a corresponding branch exit path $(P_r, P_{r+1})$ exists, and $P_{s-1}$ (if s is 1, $N_s$ is used) and $P_{+2}$ (If r is 2 x n–1, $N_e$ is used) meet the following conditions.

If each of branches corresponding to $(P_s, P_{s+1})$ and $(P_r, P_{r+1})$ has a branch structure with else, at least two different paths starting from $P_s$-i can respectively traverse then and else to reach $P_{r+2}$. If each of the corresponding branches has a branch structure without else, at least two paths starting from $P_{s-1}$ can respectively traverse then and do not traverse then to reach $P_{r+1}$.

For example, the following shows a program that has a nested branch structure:

```
S1
if (c1) {
    S2
    S3
    S4
    if(c2) {
        S5
    } else {
        S6
    }
}
S7
```

Figure 9:
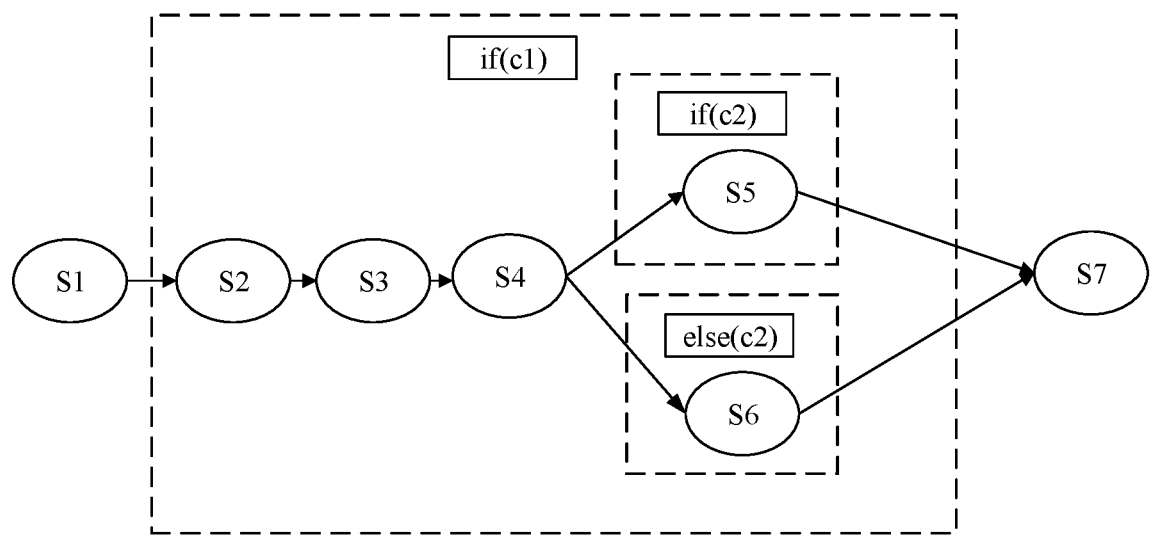
FIG. 9 is a schematic diagram of another first synchronization path graph according to this application.

It is assumed that there are synchronization paths from S1 to S7, and a corresponding first synchronization path graph is shown in FIG. 9. If a node "S1" is outside a branch statement if(c1) and a node "S2" is inside the branch statement if(c), a path from the node "S1" to the node "S2" is a branch entry path.

If a node "S4" is outside a branch statement if(c2) and a node "S5" is inside the branch statement if(c2), a path from the node "S4" to the node "S5" is a branch entry path.

If the node "S4" is outside a branch statement else(c2) and a node "S6" is inside the branch statement else(c2), a path from the node "S4" to the node "S6" is a branch entry path.

If the node "S5" is inside the branch statement if(c2) and a node "S7" is outside the branch statement if(c2), a path from the node "S5" to the node "S7" is a branch exit path.

If the node "S6" is in the branch statement else(c2) and the node "S7" is outside the branch statement else(c2)), a path from the node "S6" to the node "S7" is a branch exit path.

For example, there are two connection paths (S2,S3) and (S3,S4) between the node "S2" and the node "S4", and neither of the two paths is a branch path. Therefore, a path from the node "S2" to the node "S4" is reachable.

For another example, there are four connection paths (S1,S2), (S2,S3), (S3,S4), and (S4,S5) between the node "S1" and the node "S5". Both (S1,S2) and (S4,S5) are branch paths. However, the branch entry path (S1,S2) does not have a corresponding branch exit path (to be specific, the branch exit path and (S1,S2) traverse a same branch if(c1)), and the branch entry path (S4,S5) does not have a corresponding branch exit path. Therefore, a path from the node "S1" to the node "S5" is reachable.

For another example, there are three connection paths (S3,S4), (S4,S5), and (S5,S7) between the node "S3" and the node "S7". There are two branch paths: (S4,S5) and (S5,S7). The branch entry path (S4,S5) has the corresponding branch exit path (S5,S7). In addition, the node "S3" (corresponding to $P_{s-1}$) and the node "S7" (corresponding to $P_{r+2}$) meet the following condition: there is still a path including (S3,S4), (S4,S6), and (S6,S7) starting from the node "S3", and the path traverses else(c2). Therefore, a path from the node "S3" to the node "S7" is reachable.

For another example, there are five connection paths (S1,S2), (S2,S3), (S3,S4), (S4,S5), and (S5,S7) between the node "S1" and the node "S7". However, the branch entry paths (S1,S2) and (S4,S5), and the corresponding branch exit path (S5,S7) exist. In addition, a path that is between the node "S1" and the node "S7" and that does not traverse if(c1) is unreachable. Therefore, a synchronization path from the node "S1" to the node "S7" is unreachable.

With reference to FIG. 10(a) to FIG. 10(c) and FIG. 11(a) to FIG. 11(e), the following describes, by using an example, a process of inserting a synchronization instruction pair into a program that has a nested branch structure. As shown in the following, the program that has a nested branch structure includes four statements (S1 to S4), and the statement S2 and the statement S3 are in a branch body.

```
x = load (0x100)        //S1
if (cond) {
    x = x + 1           //S2
} else {
    x = x + 2           //S3
}
store(x, 0x200)         //S4
```

The statement S1 and the statement S4 are processed by the data access processing unit. The statement S2 and the statement S3 are processed by the computing processing unit. Serial dependency exists between the statement S1 and the statement S4. Data dependency includes: the statement S2 depends on the statement S1, the statement S3 depends on the statement S1, and the statement S4 depends on the statement S2 and the statement S3.

Figure 10A:
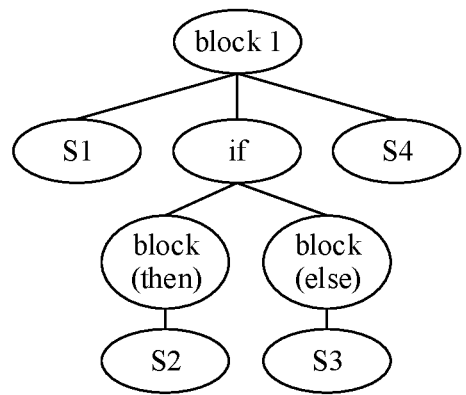
FIG. 10(a) to FIG. 10(c) are an example diagram of still another abstract syntax tree structure according to this application.
Figure 10B:
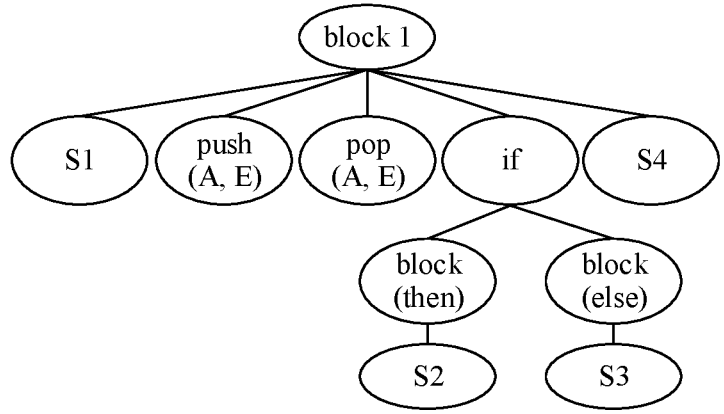
Figure 10C:
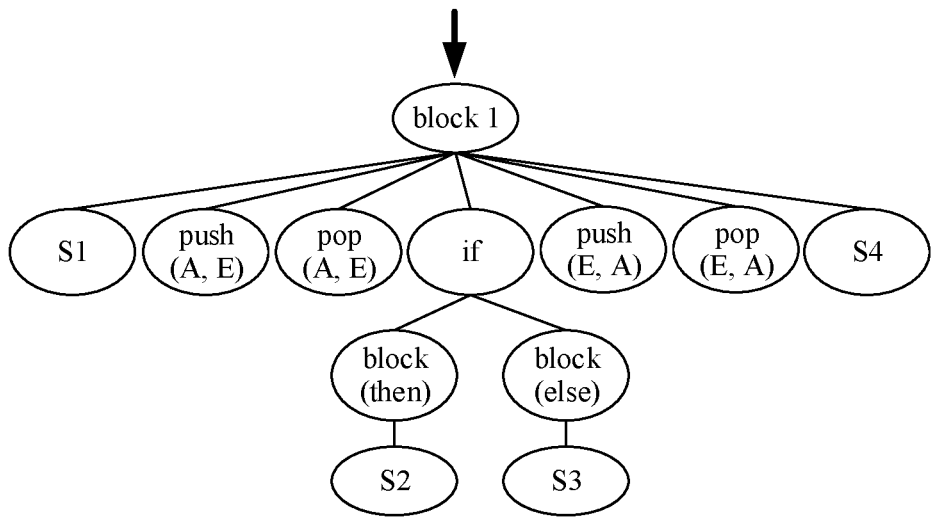

1. The program that has a nested branch structure is converted into an abstract syntax tree, as shown in FIG. 10(a). A node "block 1" and a node "if" are parent nodes, and the node "S1", the node "if", and anode "S4" are child nodes of the node "block 1". Anode "block(then)" is a child node of the node "if". A node "block(else)" is a child node of the node "if". The node "block(then)" and the node "block(else)" are parent nodes. A node "S2" is a child node of the node "block(then)". A node "S3" is a child node of the node "block(else)".

2. The nodes in the block 1 are sequentially traversed and processed, and a process of inserting a synchronization instruction pair is performed.

Figure 11A:
FIG. 11(a) to FIG. 11(e) are a schematic diagram of still another first synchronization path graph according to this application.
Figure 11B:
Figure 11C:
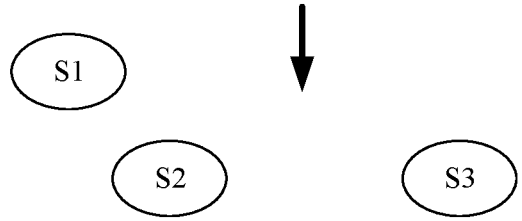
Figure 11D:
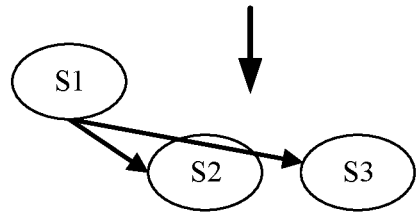
Figure 11E:
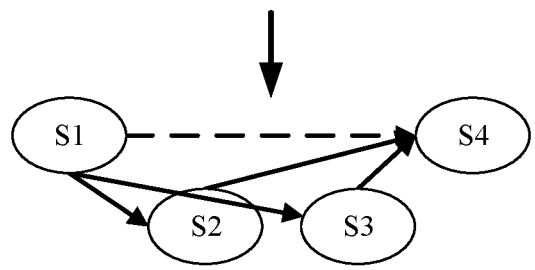

Node "S1": The node "S1" is added to the first synchronization path graph. Because the statement S1 is the first statement in the block 1, there is no statement that is in the block 1 and that can be traversed along the first direction starting from the statement S1. Certainly, a function instruction that has serial dependency on the statement S1 is not determined. Therefore, adding of a serial synchronization path of the node "S1" is not involved. It may be understood that the statement S1 is an instruction in an entry function instruction set of the data access processing unit. Similarly, a function instruction that has data dependency on the statement S1 is not determined, no synchronization instruction pair needs to be inserted, and adding of an instruction synchronization path of the node "S1" is not involved. The abstract syntax tree is still as shown in FIG. 10(a), and does not need to be changed. A change of the first synchronization path graph is shown in FIG. 11(a).

Node "if": The block(then) and the block(else) are nested in the branch statement. The block(then) includes a statement S2, and the block(else) includes a statement S3, to respectively insert a synchronization instruction pair into the block(then) and the block(else).

Node "S2": The node "S2" is added to the first synchronization path graph. Statements in the block(then) are traversed along the first direction starting from the statement S2, and a statement that has serial dependency on the statement S2 is not determined. Therefore, adding of a serial synchronization path of the node "S2" is not involved. The statements in the block(then) are traversed along the first direction starting from the statement S2, a statement that has data dependency on the statement S2 is not determined, and no synchronization instruction pair needs to be inserted. Therefore, adding of an instruction synchronization path of the node "S2" is not involved. The abstract syntax tree is still shown in FIG. 10(a), and does not need to be changed. The first synchronization path graph changes from FIG. 11(a) to FIG. 11(b).

Node "S3": The node "S3" is added to the first synchronization path graph. Statements in the block(else) are traversed along the first direction starting from the statement S3, and a statement that has serial dependency on the statement S3 is not determined. Therefore, adding of a serial synchronization path of the node "S3" is not involved. The statements in the block (else) are traversed along the first direction starting from the statement S3, a statement that has data dependency on the statement S3 is not determined, and no synchronization instruction pair needs to be inserted. Therefore, adding of an instruction synchronization path of the node "S3" is not involved. The abstract syntax tree is still as shown in FIG. 10(a), and does not need to be changed. The first synchronization path graph changes from FIG. 11(b) to FIG. 11(c).

All statements included in the branch statement are processed by the computing processing unit. Therefore, both an entry function instruction set of the computing processing unit and an exit function instruction set of the computing processing unit are [S2,S3]. A function instruction corresponding to the computing processing unit does not exist before the branch statement. Therefore, a serial synchronization path does not need to be established between a statement in the block(then) and a statement in the block (else).

In addition, it may be determined, according to S806 to S810, that the statement S2 and the statement S3 in the branch statement depend on the statement S1. Therefore, a synchronization instruction pair is added between the statement S1 and the branch statement. To be specific, push(A, E) is inserted after the statement S1, and pop(A, E) is inserted before the branch statement. An instruction synchronization path is established between the statement S1 and an entry function instruction set [S2,S3] of the branch statement. The abstract syntax tree changes from FIG. 10(a) to FIG. 10(b). The first synchronization path graph changes from FIG. 11(c) to FIG. 11(d).

Node "S4": The node "S4" is added to the first synchronization path graph. Statements in the block 1 are traversed along the first direction starting from the statement S4, to determine the statement S1 that has serial dependency on the statement S4. A serial synchronization path from the node "S1" to the node "S4" is added to the first synchronization path graph. The statements in the block 1 are traversed along the first direction starting from the statement S4, to determine the statement S2 and the statement S3 that have data dependency on the statement S4. In addition, the first synchronization path graph is queried, to determine that a path from the node "S3" to the node "S4" is unreachable and a path from the node "S2" to the node "S4" is unreachable. A synchronization instruction pair is inserted between the statement S4 and the branch statement. To be specific, a synchronization relationship is established between an exit function instruction set [S2,S3] of the branch statement and the statement S4, push(E, A) is inserted at the end of the branch body included in the branch statement, and pop(E, A) is inserted before the statement S4. An instruction synchronization path from the node "S2" to the node "S4" and an instruction synchronization path from the node "S3" to the node "S4" are added to the first synchronization path graph. The abstract syntax tree changes from FIG. 10(b) to FIG. 10(c). The first synchronization path graph changes from FIG. 11(d) to FIG. 11(e).

3. The abstract syntax tree into which the synchronization instruction pairs are inserted is converted into a program that has a nested branch structure and into which the synchronization instruction pairs are inserted. The program that has a nested branch structure and into which the synchronization instruction pairs are inserted is as follows:

```
x = load (0x100)        //S1
push(A,E)
pop(A,E)
if (cond) {
    x = x + 1           //S2
} else {
    x = x + 2           //S3
}
push(E,A)
pop(E,A)
store(x, 0x200)         //S4
```

In a third possible design, the first program block may be a structure of a compound statement. For example, if the compound statement is a loop statement (for), the n statements may be statements in a loop body, and each of the n statements may be a single function instruction. A difference from the foregoing first possible design lies in that, after synchronization is established for the statements in the loopbody, reverse traversal further needs to be performed on the n statements in the first program block, and a synchronization instruction pair is inserted between the statements in the loop body, to establish reverse synchronization and configure a paired synchronization instruction. In addition, synchronization between the statement in the first program block and a statement outside the first program block further needs to be established. For details, refer to descriptions in the following related embodiments.

Figure 12A:
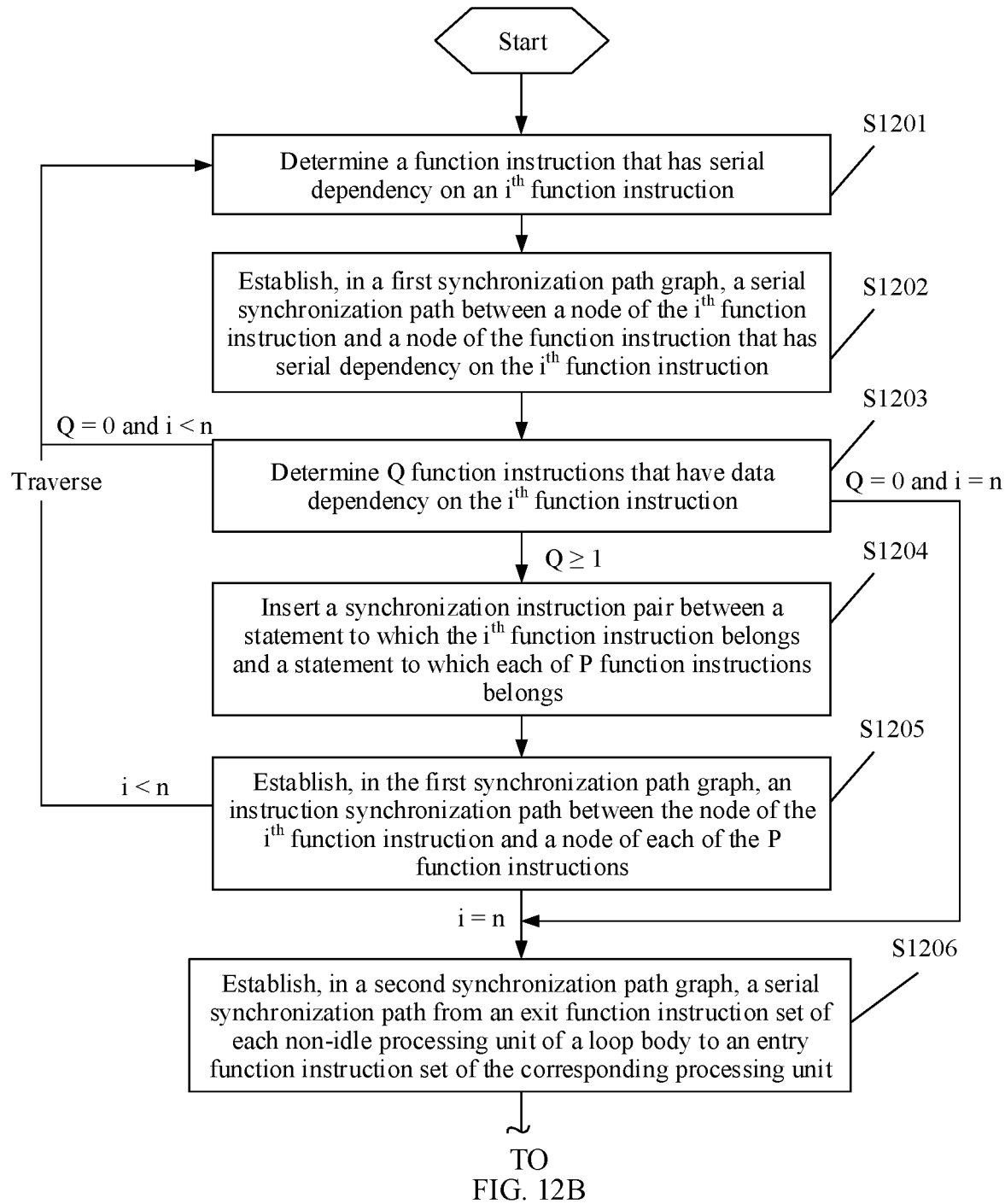
FIG. 12A to FIG. 12C are a flowchart of still another synchronization instruction insertion method according to an embodiment of this application.
Figure 12B:
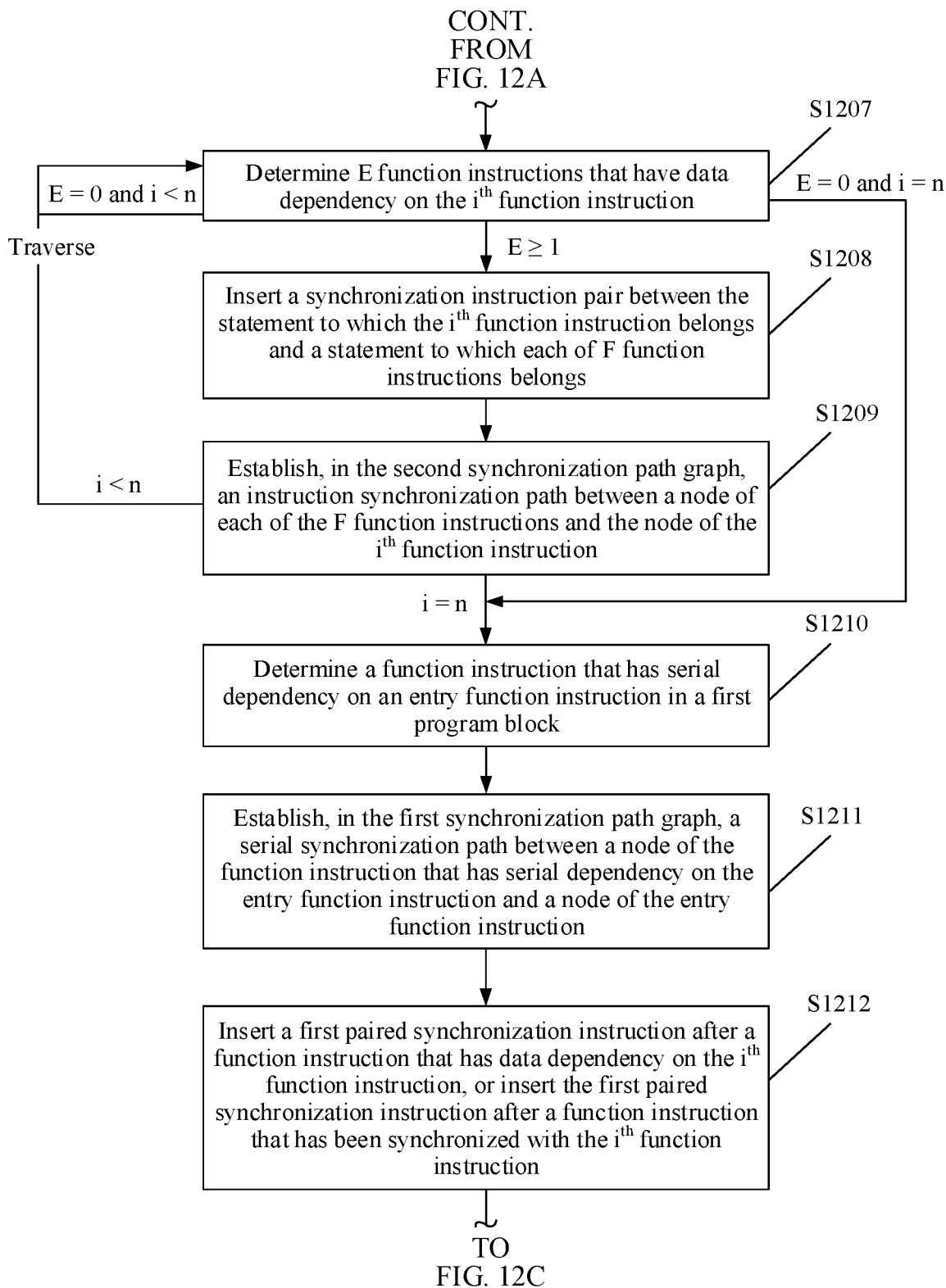
Figure 12C:
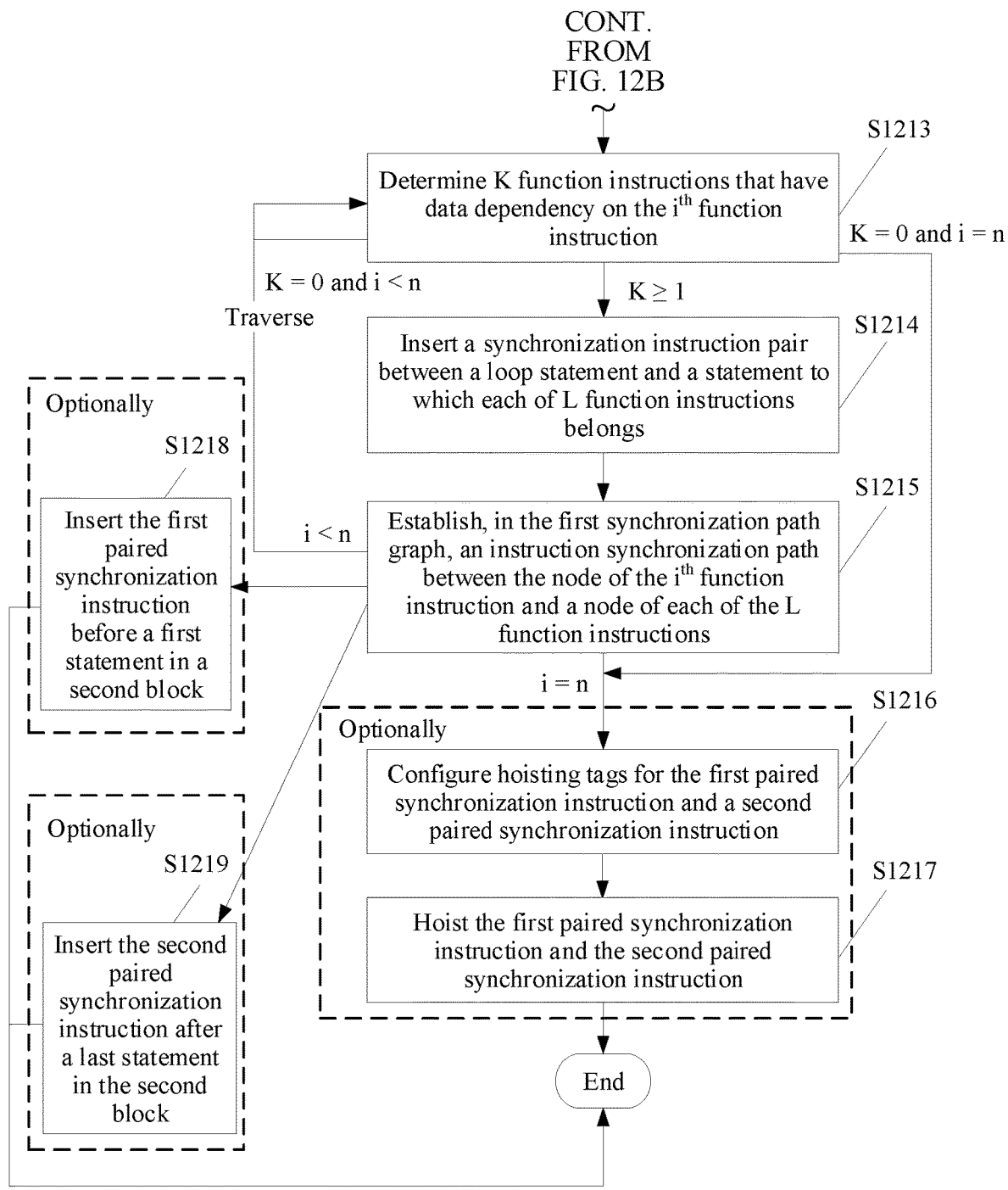

FIG. 12A to FIG. 12C are a flowchart of a synchronization instruction insertion method according to an embodiment of this application. As shown in FIG. 12A to FIG. 12C, the method may include the following steps.

S1201: Determine a function instruction that has serial dependency on an $i^{th}$ function instruction.

In some embodiments, statements in the first program block are traversed along a first direction starting from the $i^{th}$ function instruction, to determine the function instruction that has serial dependency on the $i^{th}$ function instruction.

S1202: Establish, in a first synchronization path graph, a serial synchronization path between a node of the $i^{th}$ function instruction and a node of the function instruction that has serial dependency on the $i^{th}$ function instruction.

For details, refer to the specific descriptions of S501 and S502. Details are not described again.

S1203: Determine Q function instructions that have data dependency on the $i^{th}$ function instruction.

In some embodiments, the statements in the first program block may be traversed along the first direction starting from the $i^{th}$ function instruction, to determine the Q function instructions that have data dependency on the $i^{th}$ function instruction, where Q is an integer. For details, refer to the specific description of S503. Details are not described again.

It should be noted that the first program block is a loop structure. When Q=0 and i=n, it indicates that the $i^{th}$ function instruction is a last function instruction in the first program block, and the function instruction that has data dependency on the $i^{th}$ function instruction is not determined. In this case, S1206 to S1219 are performed.

When Q is greater than or equal to 1, it indicates that the function instruction that has data dependency on the $i^{th}$ function instruction is determined, and S1204 is performed.

S1204: Insert a synchronization instruction pair between a statement to which the $i^{th}$ function instruction belongs and a statement to which each of P function instructions belongs.

In a possible implementation, the synchronization instruction pair may be inserted between the $i^{th}$ function instruction and each of the Q function instructions based on the first synchronization path graph.

For example, the first synchronization path graph may be queried to determine whether a path from a node of each of the Q function instructions to the node of the $i^{th}$ function instruction is reachable, so as to determine the P function instructions, in the Q function instructions, that have no synchronization relationship with the $i^{th}$ function instruction, where p is an integer, and 0≤P≤Q.

For details, refer to the specific description of S504. Details are not described again.

It should be noted that the first program block is a loop structure. When P=0 and i=n, it indicates that the $i^{th}$ function instruction is the last function instruction in the first program block, and a function instruction that has no synchronization relationship with the $i^{th}$ function instruction does not exist in the Q function instructions. In this case, S1206 to S1219 are performed.

S1205: Establish, in the first synchronization path graph, an instruction synchronization path between the node of the $i^{th}$ function instruction and a node of each of the P function instructions.

The instruction synchronization path from the node of each of the P function instructions to the node of the $i^{th}$ function instruction is added to the first synchronization path graph.

For details, refer to the specific description of S505. Details are not described again.

In some embodiments, when i=n, it indicates that the $i^{th}$ function instruction is the last function instruction in the first program block. In this case, S1206 to S1219 are performed.

In some other embodiments, when i<n, it indicates that the $i^{th}$ function instruction is not the last function instruction in the first program block. In this case, another statement in the first program block continues to be traversed along a second direction, and synchronization between the statement and a statement in the first program block along the first direction starting from the statement is established. For details, refer to details in S1201 to S1205.

After S1201 to S1205 are performed on n statements, reverse traversal further needs to be performed on the n statements in the first program block, and the synchronization instruction pair is inserted between the statements in the loop body, to establish reverse synchronization. Details are as follows.

Because the first synchronization path graph is a directed acyclic graph, to avoid a loop, this application provides a second synchronization path graph. The second synchronization path graph is a dynamically maintained graph used to express a directed dependency relationship between reversely synchronized function instructions. The second synchronization path graph may be referred to as a partial reverse synchronization path graph of a nested structure. The second synchronization path graph may also be understood as a reverse synchronization path graph of a node of the statement in the first program block. The second synchronization path graph is used for a reverse synchronization process of a current program block. Nodes in the graph indicate function instructions, and a connecting line between the nodes indicates a synchronization path. The synchronization path includes a serial synchronization path and an instruction synchronization path.

The serial synchronization path may be a serial synchronization path between a last function instruction (namely, an exit function instruction set) and a first function instruction (namely, an entry function instruction set) that are in the first program block and that are processed by a same processing unit.

The instruction synchronization path may be a connecting line between any two statements S1 and S2 in the first program block, and the statement S1 is before the statement S2 (or the statement S1 is the statement S2). If instruction synchronization from a processing unit D2 of the statement S2 to a processing unit D1 of the statement S1 is established, correspondingly, a synchronization path from an exit function instruction set of the statement S2 processed by D2 to an entry function instruction set of the statement S1 processed by D1 needs to be established.

When the second synchronization path graph is used for the first time, the second synchronization path graph needs to be initialized first, and step S1206 is performed.

S1206: Establish, in the second synchronization path graph, a serial synchronization path from an exit function instruction set of each non-idle processing unit of the loop body to an entry function instruction set of a corresponding processing unit. S1207 is performed.

For example, a serial synchronization path from an exit function instruction set of a data access processing unit of the loop body to an entry function instruction set of the data access processing unit is established.

For another example, a serial synchronization path from an exit function instruction set of a computing processing unit of the loop body to an entry function instruction set of the computing processing unit is established.

It is assumed that there are two sequential statements S1 and S2 in the first program block, and the statement S1 is before the statement S2. If a function instruction I2 in the statement S2 and a function instruction I1 in the statement S1 meet the following condition: a reachable path (N1→N2) exists in the second synchronization path graph, so that paths (I2, N1) and (N2, I1) are simultaneously reachable, it is considered that a reverse path from the function instruction I2 to the function instruction I1 is reachable.

S1207: Determine E function instructions that have data dependency on the $i^{th}$ function instruction.

In some embodiments, the statements in the first program block are traversed along the first direction starting from the last function instruction in the first program block to the $i^{th}$ function instruction, to determine the E function instructions that have data dependency on the $i^{th}$ function instruction, where E is an integer.

Particularly, if E=0, it indicates that the function instruction that has data dependency on the $i^{th}$ function instruction is not determined. In this case, an insertion operation of a reverse synchronization instruction pair does not need to be performed.

Optionally, if the first direction is a direction of an arrangement sequence of the statements included in the first program block, the statements in the first program block may be traversed along the first direction from a first function instruction in the first program block to the $i^{th}$ function instruction, to determine the E function instructions that have data dependency on the $i^{th}$ function instruction.

It should be noted that the first program block is a loop structure. When E=0 and i=n, it indicates that the $i^{th}$ function instruction is the last function instruction in the first program block, and the function instruction that has data dependency on the $i^{th}$ function instruction is not determined. In this case, S1210 to S1219 are performed.

When E is greater than or equal to 1, it indicates that the function instruction that has data dependency on the $i^{th}$ function instruction is determined, and S1208 is performed.

S1208: Insert a synchronization instruction pair between the statement to which the $i^{th}$ function instruction belongs and a statement to which each of F function instructions belongs.

In some embodiments, when the synchronization instruction pair is inserted, the F function instructions that have no synchronization relationship with the $i^{th}$ function instruction in the E function instructions are determined based on the second synchronization path graph and the first synchronization path graph, where F is an integer, and 0≤F≤E. Specifically, the second synchronization path graph and the first synchronization path graph may be queried, to determine whether a path from a node of each of the E function instructions to the node of the $i^{th}$ function instruction is reachable, so as to determine, in the E function instructions, the function instructions that have no synchronization relationship with the $i^{th}$ function instruction. For other specific explanations, refer to the descriptions of S504. Details are not described again.

For example, it is assumed that statements S1, S2, and S3 are arranged in sequence, and a reverse synchronization path from the statement S2 to the statement S1 needs to be established. The first synchronization path graph is queried to obtain that a path from a node of the statement S2 to a node of the statement S3 is reachable, and the second synchronization path graph is queried to obtain that a reverse path from the node of the statement S3 to a node of the statement S1 is reachable. In this case, it may be determined that a reverse synchronization path from the node of the statement S2 to the node of the statement S1 is reachable, and a reverse synchronization relationship has been established between the statement S2 and the statement S1.

Specifically, a push instruction is inserted after the function instruction that has data dependency on the $i^{th}$ function instruction, and a pop instruction is inserted before the $i^{th}$ function instruction.

For example, the function instruction I1 exists in a traversed statement, the function instruction I2 exists in a current statement, and I1 and I2 meet the following conditions.

(1) The function instruction I1 and the function instruction I2 are processed by different processing units.

(2) Data dependency exists between the function instruction I1 and the function instruction I2.

(3) In the second synchronization path graph, a path between a node of the function instruction I1 and a node of the function instruction I2 is unreachable.

In this case, a synchronization instruction pair needs to be inserted between the traversed statement to which the function instruction I1 belongs and the current statement to which the function instruction I2 belongs. For the function instruction I1 and the function instruction I2 that need to be reversely synchronized between the traversed statement and the current statement, the push instruction is inserted after the traversed statement, and the pop instruction is inserted before the current statement.

When F is greater than or equal to 1, it indicates that the function instruction that has no synchronization relationship with the $i^{th}$ function instruction exists in the E function instructions, and S1209 is performed.

S1209: Establish, in the second synchronization path graph, an instruction synchronization path between a node of each of the F function instructions and the node of the $i^{th}$ function instruction.

The instruction synchronization path from the node of each of the F function instructions to the node of the $i^{th}$ function instruction is added to the second synchronization path graph. In some embodiments, a synchronization path from an exit function instruction set of a to-be-synchronized statement processed by a processing unit corresponding to the function instruction I1 to an entry function instruction set of the $i^{th}$ function instruction processed by a processing unit corresponding to the function instruction I2 is established.

Further, after synchronization is established between the statements in the first program block, synchronization further needs to be performed between a statement in a loop statement and a statement before the loop statement.

S1210: Determine a function instruction that has serial dependency on an entry function instruction in the first program block.

In some embodiments, starting from the loop statement, function instructions before the loop statement are traversed along the first direction, to determine the function instruction that has serial dependency on the entry function instruction in the first program block. Two function instructions between which serial dependency exists are executed by a same processing unit in a serial manner. If the function instruction that has serial dependency on the entry function instruction in the first program block is traversed, S1211 is performed.

For other specific explanations, refer to the descriptions of S806. Details are not described again.

S1211: Establish, in the first synchronization path graph, a serial synchronization path between a node of the function instruction that has serial dependency on the entry function instruction and a node of the entry function instruction.

The serial synchronization path from the node of the function instruction that has serial dependency on the entry function instruction to the node of the entry function instruction is added to the first synchronization path graph.

For specific explanations of S1211, refer to the descriptions of S807. Details are not described again.

Further, synchronization instructions that meet the conditions further need to be paired. To be specific, paired synchronization instructions are inserted, and a corresponding instruction synchronization path is established in the first synchronization path graph. The paired synchronization instructions include a paired push synchronization instruction and a paired pop synchronization instruction.

The paired push synchronization instruction refers to a corresponding push instruction that needs to be inserted before the loop statement.

The paired pop synchronization instruction refers to a corresponding pop instruction that needs to be inserted after the loop statement.

The paired synchronization instruction may be generated in a block processing process of the loop structure, and then a corresponding synchronization instruction is inserted in an outer block (parent block). Specifically, details in S1212 are as follows:

S1212: Insert a first paired synchronization instruction after the function instruction that has data dependency on the $i^{th}$ function instruction, or insert the first paired synchronization instruction after a function instruction that has been synchronized with the $i^{th}$ function instruction.

In some embodiments, it is assumed that a pop instruction is inserted before the $i^{th}$ function instruction. Statements before the loop statement are traversed along the first direction starting from the loop statement. If the function instruction that has data dependency on the $i^{th}$ function instruction is traversed, or the function instruction that has been synchronized with the $i^{th}$ function instruction is traversed, the paired push synchronization instruction is inserted after the function instruction that has data dependency or after the synchronized function instruction. The first paired synchronization instruction may be a paired push synchronization instruction.

For example, it is assumed that a statement after the pop instruction is S2, the function instruction I1 exists in the statement S2, and a processing unit that processes the statement S2 is D1. Statements before the statement S2 are traversed along the first direction starting from the statement S2. If the statement S1 is traversed, the function instruction I2 exists in the statement S1, a processing unit that processes the statement S1 is D2, and one of the following conditions is met, it is considered that the paired push synchronization instruction is suitable to be inserted after the statement S1.

(1) Data dependency exists between the function instruction I1 and the function instruction I2, indicating that a corresponding instruction synchronization path is established from the statement S1 to the statement S2.

(2) In the first synchronization path graph, a path between the node of the function instruction I1 and the node of the function instruction I2 is reachable, indicating that synchronization from the statement S1 to the statement S2 has been established. Therefore, inserting the paired push synchronization instruction does not introduce additional parallel overheads.

Then, in the first synchronization path graph, an instruction synchronization path is established from an exit function instruction set of the statement S1 processed by the processing unit D2 to an entry function instruction set of S2 processed by the processing unit D1.

Optionally, it is assumed that a push instruction is inserted after the $i^{th}$ function instruction. For a statement after the $i^{th}$ function instruction, if there is the function instruction that has data dependency on the $i^{th}$ function instruction or the function instruction that has been synchronized with the $i^{th}$ function instruction, the paired pop synchronization instruction is inserted after the function instruction that has data dependency or after the synchronized function instruction. The second paired synchronization instruction may be a paired pop synchronization instruction.

It should be noted that the paired synchronization instruction and a to-be-paired synchronization instruction have a same source processing unit and a same destination processing unit.

For example, it is assumed that a statement before the push instruction is S3, the function instruction I1 exists in the statement S3, and a processing unit that processes the statement S3 is D1. If a statement S4 is traversed, the function instruction I2 exists in the statement S4, a processing unit that processes the statement S4 is D2, and one of the following conditions is met, it is considered that the paired pop synchronization instruction is suitable to be inserted before the statement S4.

(1) Data dependency exists between the function instruction I1 and the function instruction I2, indicating that a corresponding instruction synchronization path is established from the statement S3 to the statement S4.

(2) In the first synchronization path graph, the path between the node of the function instruction I1 and the node of the function instruction I2 is reachable, indicating that synchronization has been established between the statement S3 and the statement S4. Therefore, inserting the paired pop synchronization instruction does not introduce additional parallel overheads.

Then, in the first synchronization path graph, an instruction synchronization path from an exit function instruction set of the statement S3 processed by the processing unit D2 to an entry function instruction set of the statement S4 processed by the processing unit D1 is established.

Compared with a conventional technology in which paired synchronization instructions are directly inserted before and after the loop statement, in a paired synchronization instruction insertion method provided in this application, the paired synchronization instructions may be stretched forward and backward as much as possible before and after the loop statement. In this way, the paired synchronization instructions are prevented from additionally introducing unnecessary synchronization between function instructions. Therefore, parallelism between function instructions is further improved by stretching the paired synchronization instructions.

For example, as shown in the following program, no dependency relationship exists between the statement S1 and the statement S2, and data dependency exists between the statement S2 and the statement S3. When the paired synchronization instruction is inserted by using the conventional technology, during first iterative execution of the loop body, additional synchronization dependency are introduced to the statement S1 and the statement S2 because of a paired push synchronization instruction from the statement S3 to the statement S2. To be specific, push(E, A) is inserted after the statement S1.

```
y = 0                          //S1
push(E, A) //existing push pairing
for(inner, ...) {
  pop(E, A)
  x = load(0x100)              //S2
  push(A, E)
  pop(A, E)
  x = x+1                      //S3
  push(E, A)
}
pop(E, A) // pop pairing
```

According to the paired synchronization instruction insertion method provided in this application, the paired push synchronization instruction is stretched forward before the statement S1, so that redundant synchronization dependency between the statement S1 and the statement S2 is eliminated, as shown in the following program:

```
push(E, A) //push pairing after stretching
y = 0                          //S1
for(inner, ...) {
  pop(E, A)
  x = load(0x100)              //S2
  push(A, E)
  pop(A, E)
  x = x+1                      //S3
  push(E, A)
}
pop(E, A) // pop pairing
```

S1213: Determine K function instructions that have data dependency on the $i^{th}$ function instruction.

In some embodiments, function instructions before the loop statement may be traversed along the first direction starting from the $i^{th}$ function instruction, to determine the K function instructions that have data dependency on the $i^{th}$ function instruction, where K is an integer. The K function instructions that have data dependency on the $i^{th}$ function instruction are statements outside the first program block.

Particularly, if K=0, it indicates that the function instruction that has data dependency on the $i^{th}$ function instruction is not determined. In this case, the insertion operation of the synchronization instruction pair does not need to be performed. For example, another function instruction before the loop statement along the first direction starting from the $i^{th}$ function instruction does not exist. Certainly, the function instruction that has data dependency on the $i^{th}$ function instruction is not determined. For another example, if both the function instruction arranged along the first direction starting from the $i^{th}$ function instruction and the $i^{th}$ function instruction are executed by a same processing unit, it indicates that serial dependency exists between the function instruction arranged along the first direction starting from the $i^{th}$ function instruction and the $i^{th}$ function instruction. Certainly, the function instruction that has data dependency on the $i^{th}$ function instruction is not determined.

For other specific explanations, refer to the descriptions of S503. Details are not described again.

When K is greater than or equal to 1, it indicates that the function instruction that has data dependency on the $i^{th}$ function instruction is determined, and S1214 is performed.

S1214: Insert a synchronization instruction pair between the loop statement and a statement to which each of L function instructions belongs.

In a possible implementation, the L function instructions that have no synchronization relationship with the $i^{th}$ function instruction and that are in the K function instructions may be determined based on the first synchronization path graph. L is an integer, and $0 \le L \le K$.

In some embodiments, if the function instruction that has no synchronization relationship with the $i^{th}$ function instruction is not a function instruction in a compound statement, a push instruction is inserted after the function instruction, and a pop instruction is inserted before the loop statement.

In some other embodiments, if the function instruction that has no synchronization relationship with the $i^{th}$ function instruction is a function instruction in a compound statement, a push instruction may be inserted at the end of a structure body of the compound statement including the function instruction, and a pop instruction may be inserted before the loop statement.

For other specific explanations, refer to the descriptions of S504. Details are not described again.

When L is greater than or equal to 1, it indicates that the function instruction that has no synchronization relationship with the $i^{th}$ function instruction exists in the K function instructions, and S1215 is performed.

S1215: Establish, in the first synchronization path graph, an instruction synchronization path between the node of the $i^{th}$ function instruction and a node of each of the L function instructions.

The instruction synchronization path from the node of each of the L function instructions to the node of the $i^{th}$ function instruction is added to the first synchronization path graph.

In a multi-layer loop scenario, in the conventional technology, paired synchronization instructions of an inner loop are directly inserted before and after an inner loop statement. In this case, the paired synchronization instructions are executed for a plurality of times with an outer loop, and even parallelism may be reduced. According to the synchronization instruction insertion method provided in this embodiment of this application, paired synchronization instructions that have not been inserted can be hoisted, and execution of the paired synchronization instructions is reduced by hoisting the paired synchronization instructions. Therefore, the parallelism between function instructions is further improved by hoisting the paired synchronization instructions.

If the first paired synchronization instruction and the second paired synchronization instruction constitute a synchronization instruction pair, hoisting tags may be configured for the first paired synchronization instruction and the second paired synchronization instruction. If the first program block is nested in another loop statement, the first paired synchronization instruction and the second paired synchronization instruction may be further hoisted. The method further includes the following steps.

S1216: Configure the hoisting tags for the first paired synchronization instruction and the second paired synchronization instruction.

If a paired push synchronization instruction and a paired pop synchronization instruction that are processed by a same synchronized processing unit and a same synchronizing processing unit exist, the paired push synchronization instruction and the paired pop synchronization instruction are marked as hoisting.

S1217: Hoist the first paired synchronization instruction and the second paired synchronization instruction.

If the first program block is a nested structure in a multi-layer loop, the first paired synchronization instruction and the second paired synchronization instruction are hoisted. It should be noted that the paired push synchronization instruction and the paired pop synchronization instruction need to be hoisted in pairs.

As shown in the following multi-layer loop, before the paired synchronization instructions are hoisted, for statements S3 to S1, because push(E, A) and pop(E, A) after the statement S3 are paired, synchronization is established between the statement S3 and the statement S1.

```
for(i=0; i<n;i++) {
    push(E, A) //original push pairing
    for(j=0;j<m; j++) {
        store(0, 0x200 + i*m+j)        //S1
        pop(E, A)
        x = load (0x100)                //S2
        push(A, E)
        pop(A, E)
        x = x +1                        //S3
        push(E, A)
    }
    pop(E, A) //original pop pairing
}
```

After the paired synchronization instructions are hoisted from a block in which an initial m-loop is located to a block in which an n-loop is located, the statement S3 and the statement S1 may be executed in parallel, as shown in the following program:

```
push(E, A) //push pairing after hoisting
for(i=0; i<n;i++) {
    for(j=0;j<m; j++) {
        store(0, 0x200 + i*m+j)        //S1
        pop(E, A)
        x = load (0x100)                //S2
        push(A, E)
        pop(A, E)
```

-continued

```
        x = x +1                        //S3
        push(E, A)
    }
}
pop(E, A) //pop pairing after hoisting
```

Optionally, if no other statement exists after the loop statement, synchronization between function instructions may not need to be established. If another statement is included after the loop statement, synchronization between function instructions is also established according to the descriptions of S501 to S505. Details are not described again. It should be noted that, if the function instruction that has no synchronization relationship with the $i^{th}$ function instruction is the statement in the compound statement, the push instruction may be inserted at the end of the structure body of the compound statement including the function instruction, and the pop instruction may be inserted before the statement to which the $i^{th}$ function instruction belongs.

In addition, for all remaining synchronization instructions in the first program block that have not been paired, namely, function instructions that have data dependency on a function instruction into which a synchronization instruction is inserted and that are not traversed, or function instructions that have been synchronized with the function instruction into which the synchronization instruction is inserted and that are not traversed, this application further includes the following steps. It is assumed that the first program block is nested in a second program block.

S1218: Insert the first paired synchronization instruction before a first statement in the second program block; or/and S1219: Insert the second paired synchronization instruction after a last statement in the second program block.

It may be understood that the first paired synchronization instruction is inserted before a first statement in an outermost program block.

It may be understood that the second paired synchronization instruction is inserted after a last statement in the outermost program block.

According to the synchronization instruction insertion method provided in this application and based on data dependency between function instructions and the synchronization path graph, a synchronization instruction pair is automatically inserted between function instructions between which a synchronization relationship is not established, to establish synchronization between the function instructions between which data dependency exists. In this way, the parallelism between the function instructions can be effectively improved. This improves processing performance of a DAE processor or a DAE-like processor in processing the function instructions. Inserting the synchronization instruction pair based on the data dependency between the function instructions significantly reduces indirect synchronization between the function instructions. Inserting the synchronization instruction pair based on the synchronization path graph significantly reduces a redundant synchronization instruction pair inserted based on the data dependency between the function instructions.

Particularly, in some embodiments, the first program block may be a separate program block, and is not nested in another program block. In this case, S1210 and S1213 may be normally performed. However, the function instruction that has serial dependency on the entry function instruction in the first program block and the function instruction that has data dependency on the function instruction in the first program block are not traversed.

In some other embodiments, the first program block may have a nested structure, and the first program block is nested in the second program block. Another statement in the second program block is further included before the first program block, and synchronization is established for the another statement in the second program block. For details, refer to the detailed descriptions of S501 to S506. Details are not described again. However, another statement in the second program block is not included after the first program block. In this case, it indicates that execution of the second program block is completed.

In some other embodiments, if the first program block has a nested structure, the first program block is nested in the second program block. However, another statement in the second program block is further included after the first program block. In this case, it indicates that execution of the second program block is not completed. After S1219 is executed, for the another statement in the second program block, statements before the another statement in the second program block further need to be traversed along the first direction, to determine function instructions that have data dependency and serial dependency on the another statement in the second program block. Then, synchronization of the another statement in the second program block is established. For details, refer to the detailed descriptions of S501 to S505. Details are not described again. It should be noted that, if the function instruction that has no synchronization relationship with the $i^{th}$ function instruction is the statement in the compound statement, the push instruction may be inserted at the end of the structure body of the compound statement including the function instruction, and the pop instruction may be inserted before the current statement.

In addition, a programmer can manually insert a synchronization instruction into a program in the conventional technology. However, this brings problems such as skill dependency and complexity to the programmer. A difference of the synchronization instruction insertion method provided in this application lies in that: the synchronization instruction pair is automatically inserted, so that insertion of the synchronization instruction pair is more universal, and complexity of synchronization instruction pair insertion is completely shielded for the programmer.

With reference to FIG. 13(a) to FIG. 13(e) and FIG. 14(a) to FIG. 14(e), the following describes, by using an example, a process of inserting a synchronization instruction pair into a program that has a nested loop structure. As shown below, the program that has a nested loop structure includes four statements (S1 to S4). The statement S2 and the statement S3 are in a loop body. A loop statement for(j) is nested in a loop statement for(i).

| | |
|---|---|
| y = 0 | //S1 |
| for (i...) { | |
|   for(j ...) { | |
|     x = load(j) | //S2 |
|     y = y+x | //S3 |
|   } | |
| } | |
| store(y, 0x200) | //S4 |

The statement S2 and the statement S4 are processed by the data access processing unit. The statement 51 and the statement S3 are processed by the computing processing unit. Serial dependency exists between the statement S2 and the statement S4. Serial dependency exists between the S1 and statement S3. Data dependency includes: the statement S3 depends on the statement S1 and the statement S2, and the statement S4 depends on the statement S1 and the statement S3.

Figure 13A:
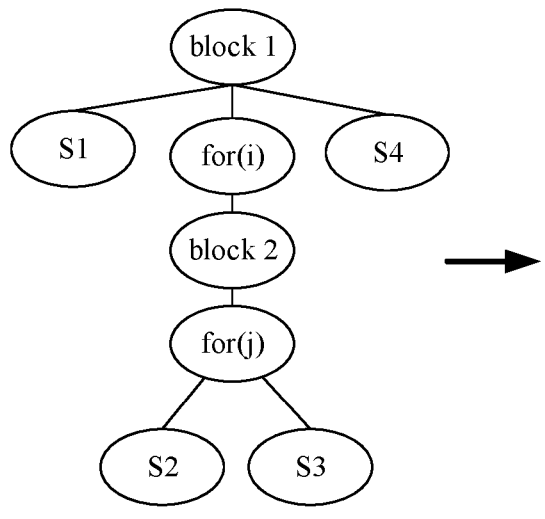
FIG. 13(a) to FIG. 13(e) are a schematic diagram of yet another abstract syntax tree structure according to this application.
Figure 13B:
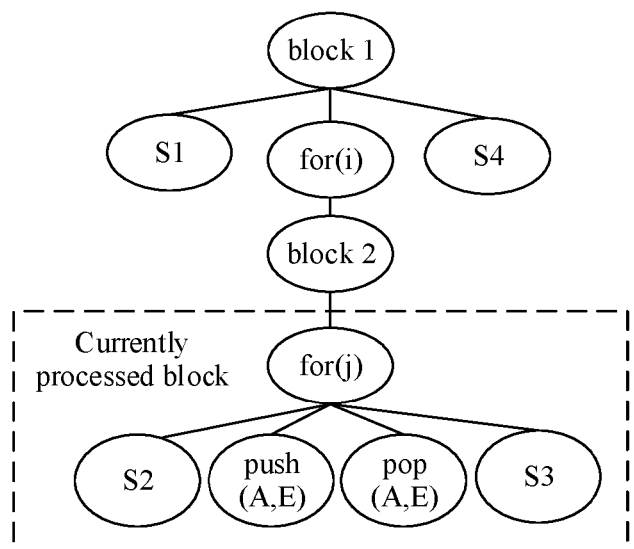

1. The program that has a nested loop structure is converted into an abstract syntax tree, as shown in FIG. 13(a). A node "block 1" is a parent node, and a node "S1", a node "for(i)" and a node "S4" are child nodes of the node "block 1". The node "for(i)" is a parent node, and a node "block 2" is nested in the node "for(i)". The node "block 2" is a child node of the node "for(i)". A node "for(j)" is a child node of the node "block 2". The for(j) node is a parent node. A node "S2" and a node "S3" are child nodes of the node "for(j).

2. The nodes in the block 1 are sequentially traversed and processed, and the process of inserting the synchronization instruction pair is performed.

Figure 14A:
FIG. 14(a) to FIG. 14(e) are a schematic diagram of yet another first synchronization path graph according to this application.
Figure 14B:
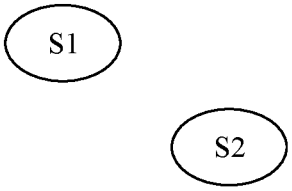

Node "S1": The node "S1" is added to the first synchronization path graph. Because the statement S1 is a first statement in the block 1, there is no statement that is in the block 1 and that can be traversed along the first direction starting from the statement S1. Certainly, a function instruction that has serial dependency on the statement S1 is not determined. Therefore, adding of a serial synchronization path of the node "S1" is not involved. Similarly, a function instruction that has data dependency on the statement S1 is not determined, no synchronization instruction pair needs to be inserted, and adding of an instruction synchronization path of the node "S1" is not involved. The abstract syntax tree is still as shown in FIG. 13(a), and does not need to be changed. A change of the first synchronization path graph is shown in FIG. 14(a).

Node "for(i)": The loop statement for(i) is a loop structure, and a recursive block processing process is performed on a loop body block 2 of for(i). The loop body block 2 includes only one loop statement for(j). In other words, the loop statement for(j) is nested in the loop statement for(i). The child node "for(j)" of the node "block 2" is processed.

Node "for(j)": The loop statement for(j) is a loop structure, and a recursive block processing process is performed on a loop body block 3 of for(j). The loop body block 3 includes the statement S2 and the statement S3, and the child node "S2" and the child node "S3" of the node "for(j)" are processed.

Node "S2": The node "S2" is added to the first synchronization path graph. Statements in the block 3 are traversed along the first direction starting from the statement S2, and a statement that has serial dependency on the statement S2 is not determined. Therefore, adding of a serial synchronization path of the node "S2" is not involved. The statements in the block 3 are traversed along the first direction starting from the statement S2, and a statement that has data dependency on the statement S2 is not determined, and no synchronization instruction pair needs to be inserted. Therefore, adding of an instruction synchronization path of the node "S2" is not involved. The abstract syntax tree is still as shown in FIG. 13(a), and does not need to be changed. The first synchronization path graph changes from FIG. 14(a) to FIG. 14(b).

Node "S3": The node "S3" is added to the first synchronization path graph. The statements in the block 3 are traversed along the first direction starting from the statement S3, and a statement that has serial dependency on the statement S3 is not determined. Therefore, adding of a serial synchronization path of the node "S3" is not involved. The statements in the block 3 are traversed along the first direction starting from the statement S3, to determine the statement S2 that has data dependency on the statement S3.

In addition, the first synchronization path graph is queried, to determine that a path from the node "S2" to the node "S3" is unreachable. A synchronization instruction pair is inserted between the statement S2 and the statement S3. To be specific, push(A, E) is inserted after the statement S2, and pop(A, E) is inserted before the statement S3. An instruction synchronization path from the node "S2" to the node "S3" is added to the first synchronization path graph. The abstract syntax tree changes from FIG. 13(a) to FIG. 13(b). The first synchronization path graph changes from FIG. 14(b) to FIG. 14(c).

Figure 15:
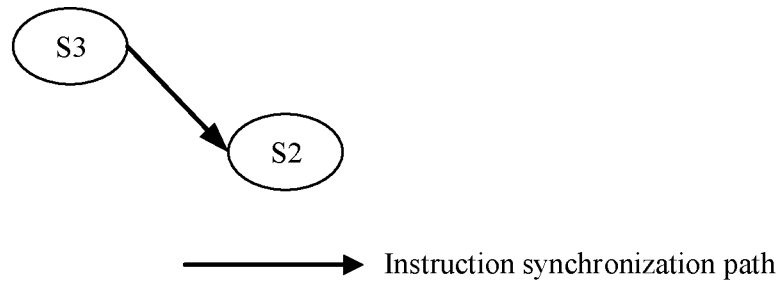
FIG. 15 is a schematic diagram of a second synchronization path graph according to this application.

In addition, a reverse synchronization instruction pair may be inserted into the statements in the loop body block 3 according to S1301 to S1308, and paired synchronization instructions are generated simultaneously. Specifically, the second synchronization path graph is first initialized, the node "S2" and the node "S3" are added to the second synchronization path graph, and a reverse serial synchronization path in the second synchronization path graph is established. The second synchronization path graph is shown in FIG. 15. The statement S2 is executed by the data access processing unit, and the statement S3 is executed by the computing processing unit. In addition, the two statements have different processing units and respectively correspond to unique nodes of the processing units in the block 3. Therefore, establishment of a reverse serial path between the node "S2" and the node "S3" is not involved.

Then, statement S2 is used as a currently processed statement, the statements in the block 3 are traversed along the first direction stating from the statement S3 (the last function instruction) in the block 3 to the statement S2, to determine that data dependency exists between the statement S3 and the statement S2 and the path from the node "S3" to the node "S2" is unreachable in the second synchronization path graph. A reverse synchronization instruction pair is inserted between the statement S3 and the statement S2. To be specific, push(E, A) is inserted after the statement S3, and pop(E, A) is inserted before the statement S2. A reverse instruction synchronization path from the node "S3" to the node "S2" is added to the second synchronization path graph. In addition, the program that has a nested loop structure is a multi-layer loop structure. To be specific, the block 3 is nested in the loop statement for(i). In addition, two reverse synchronization instructions have a same source processing unit and a same destination processing unit. Therefore, hoisting tags may be configured for the two reverse synchronization instructions. If the two reverse synchronization instructions do not meet a pairing condition, no pairing processing is performed.

Figure 13C:
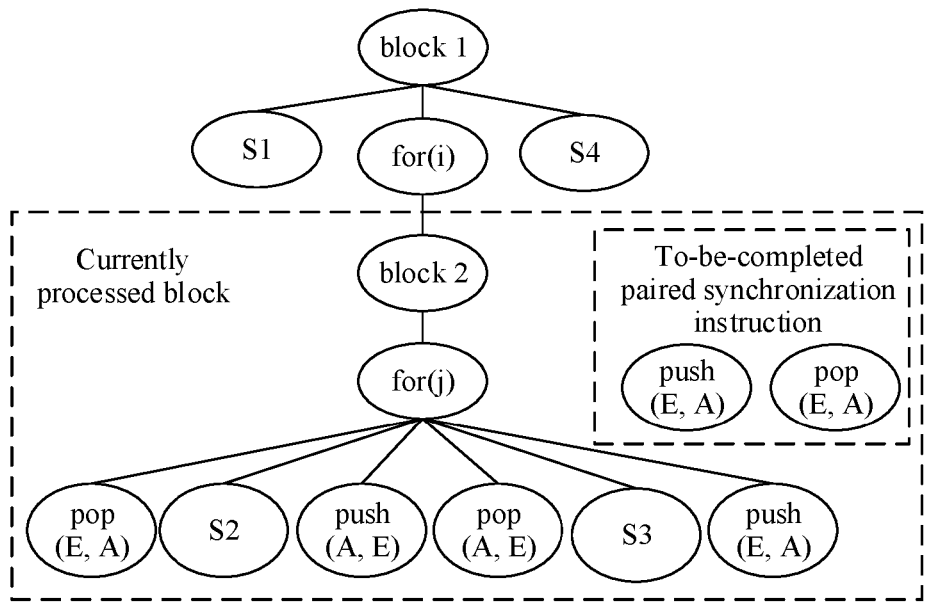
Figure 13D:
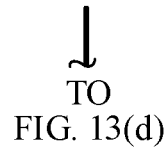
Figure 13D:
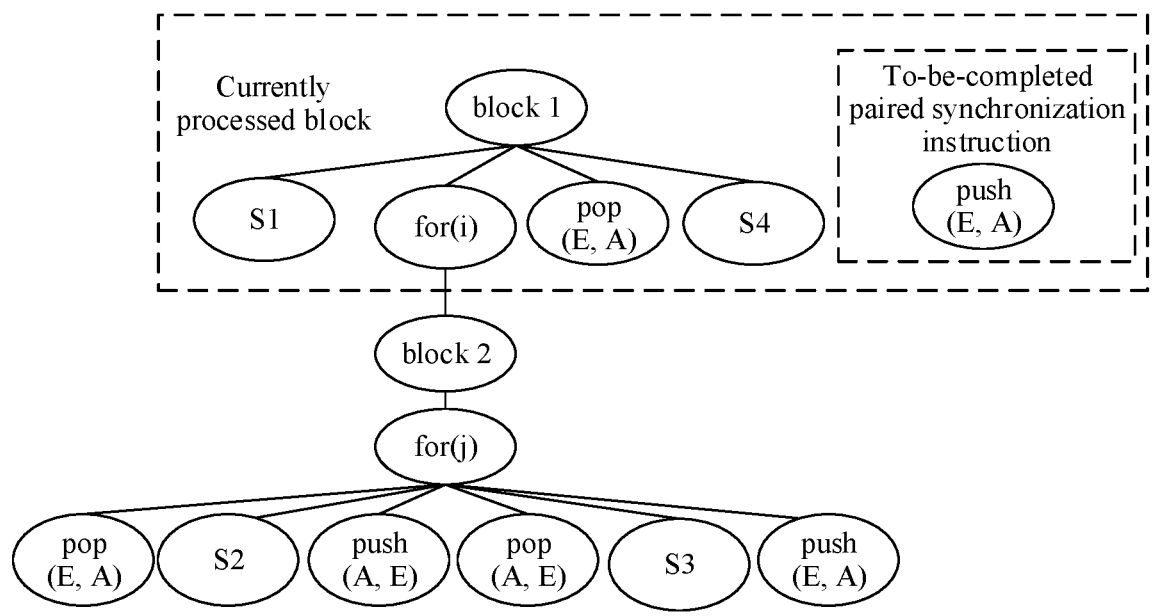
Figure 13E:
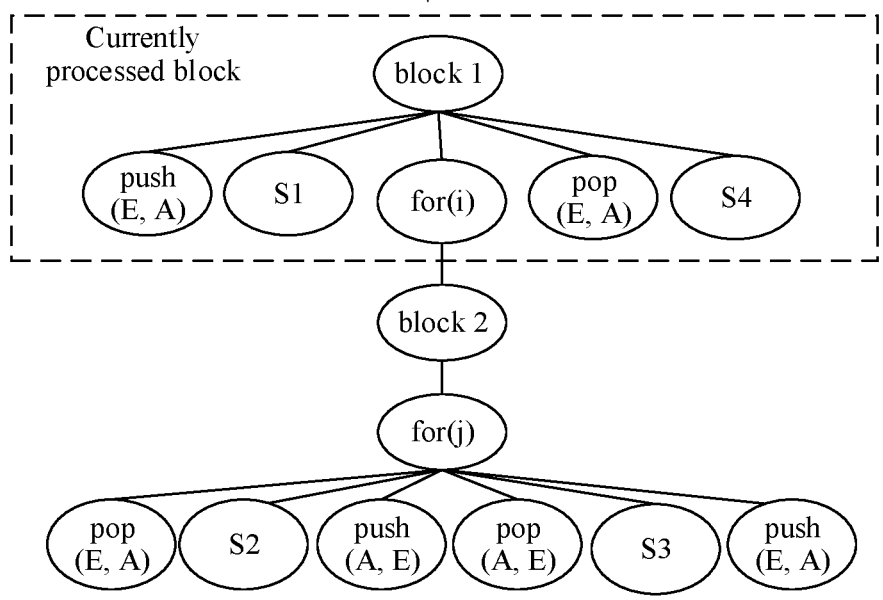
Figure 14C:
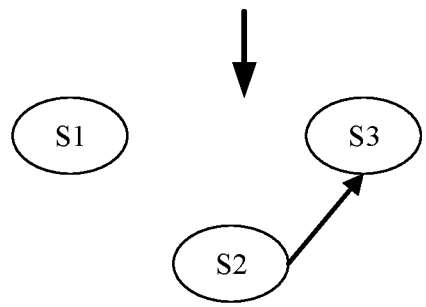
Figure 14D:
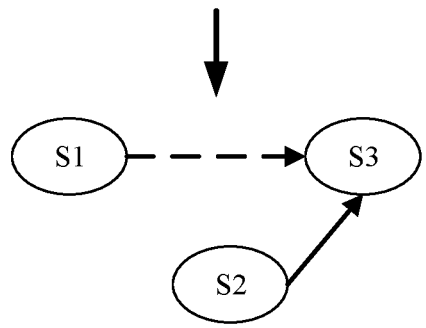
Figure 14E:
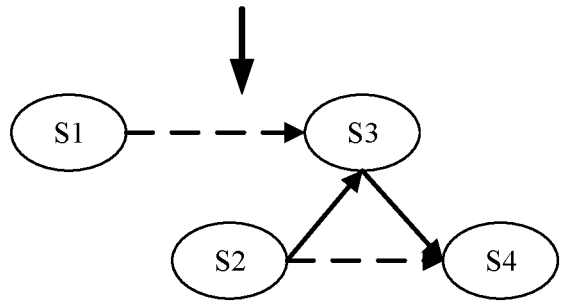

The statement S3 is used as a currently processed statement. The statement S3 is the last function instruction in the block 3, and the statements in the block 3 are traversed along the first direction starting from the statement S3 (the last function instruction) in the block 3 to the statement S3. Therefore, a function instruction that has data dependency on the statement S3 is not determined, and insertion of a reverse synchronization instruction is not involved. The abstract syntax tree changes from FIG. 13(b) to FIG. 13(c). The first synchronization path graph is still as shown in FIG. 14(c), and does not need to be changed. The second synchronization path graph is still as shown in FIG. 15.

Further, synchronization between a statement in the loop body and a statement outside the loop body is established. Because the statement for(j) is the unique node in the block 2, synchronization between the statement in the block 3 and the statement in the block 2 does not need to be established. If two to-be-paired synchronization instructions push(E, A) and pop(E, A) do not meet a paired instruction insertion condition, insertion is not performed. If the two to-be-paired synchronization instructions push(E, A) and pop(E, A) meet a hoisting condition, hoisting tags are configured, recursive return is performed, and further processing is performed in the block 1.

The statements in the block 1 are traversed along the first direction starting from the statement S2, and the statement that has serial dependency on the statement S2 is not determined. Therefore, adding of the serial synchronization path of the node "S2" is not involved. The statements in the block 1 are traversed along the first direction starting from the statement S2, and the statement that has data dependency on the statement S2 is not determined, and no synchronization instruction pair needs to be inserted. Therefore, adding of the instruction synchronization path of the node "S2" is not involved. The statements in the block 1 are traversed along the first direction starting from the statement S3, to determine that serial dependency exists between the statement S1 and the statement S3. A serial synchronization path from the node "S1" to the node "S3" is added to the first synchronization path graph. The statements in the block 1 are traversed along the first direction starting from the statement S3, to determine that data dependency exists between the statement S1 and the statement S3. In addition, the first synchronization path graph is queried, to determine that a path from the node "S1" to the node "S3" is reachable. No synchronization instruction pair needs to be inserted. The abstract syntax tree is still as shown in FIG. 13(c), and does not need to be changed. The first synchronization path graph changes from FIG. 14(c) to FIG. 14(d).

Node "S4": The node "S4" is added to the first synchronization path graph. The statements in the block 1 are traversed along the first direction starting from the statement S4, to determine the statement S2 that has serial dependency on the statement S4. A serial synchronization path from the node "S2" to the node "S4" is added to the first synchronization path graph. The statements in the block 1 are traversed along the first direction starting from the statement S4, to determine the statement S3 that has data dependency on the statement S4. In addition, the first synchronization path graph is queried, to determine that a path from the node "S3" to the node "S4" is unreachable. A synchronization instruction pair is inserted between the statement S3 and the statement S4. However, because a reverse synchronization instruction push(E, A) has been inserted after the statement S3, a paired synchronization instruction pop(E, A) is inserted before the statement S4. An instruction synchronization path from the node "S3" to the node "S4" is added to the first synchronization path graph. The abstract syntax tree changes from FIG. 13(c) to FIG. 13(d). The first synchronization path graph changes from FIG. 14(d) to FIG. 14(e).

A remaining reverse synchronization instruction push(E, A) does not meet the hoisting condition (currently, the block 1 is not in a loop). Therefore, push(E, A) is inserted before the first statement S1 of the block 1. The abstract syntax tree changes from FIG. 13(d) to FIG. 13(e).

3. The abstract syntax tree into which the synchronization instruction pairs are inserted is converted into a program that has a nested loop structure and into which the synchronization instruction pairs are inserted. The program that has a nested loop structure and into which the synchronization instruction pairs are inserted is as follows:

```
push(E,A)
y = 0                        //S1
for(i,...) {
    for(j, ...) {
        pop(E,A)
        x = load(j)          //S2
        push(A,E)
        pop(A,E)
        y = y+x              //S3
        push(E,A)
    }
}
pop(E,A)
store(y, 0x200)              //S4
```

The foregoing embodiments describe in detail the processes of respectively inserting synchronization instruction pairs into the program that has a sequential structure, the program that has a branch structure, and the program that has a loop structure.

Figure 16:
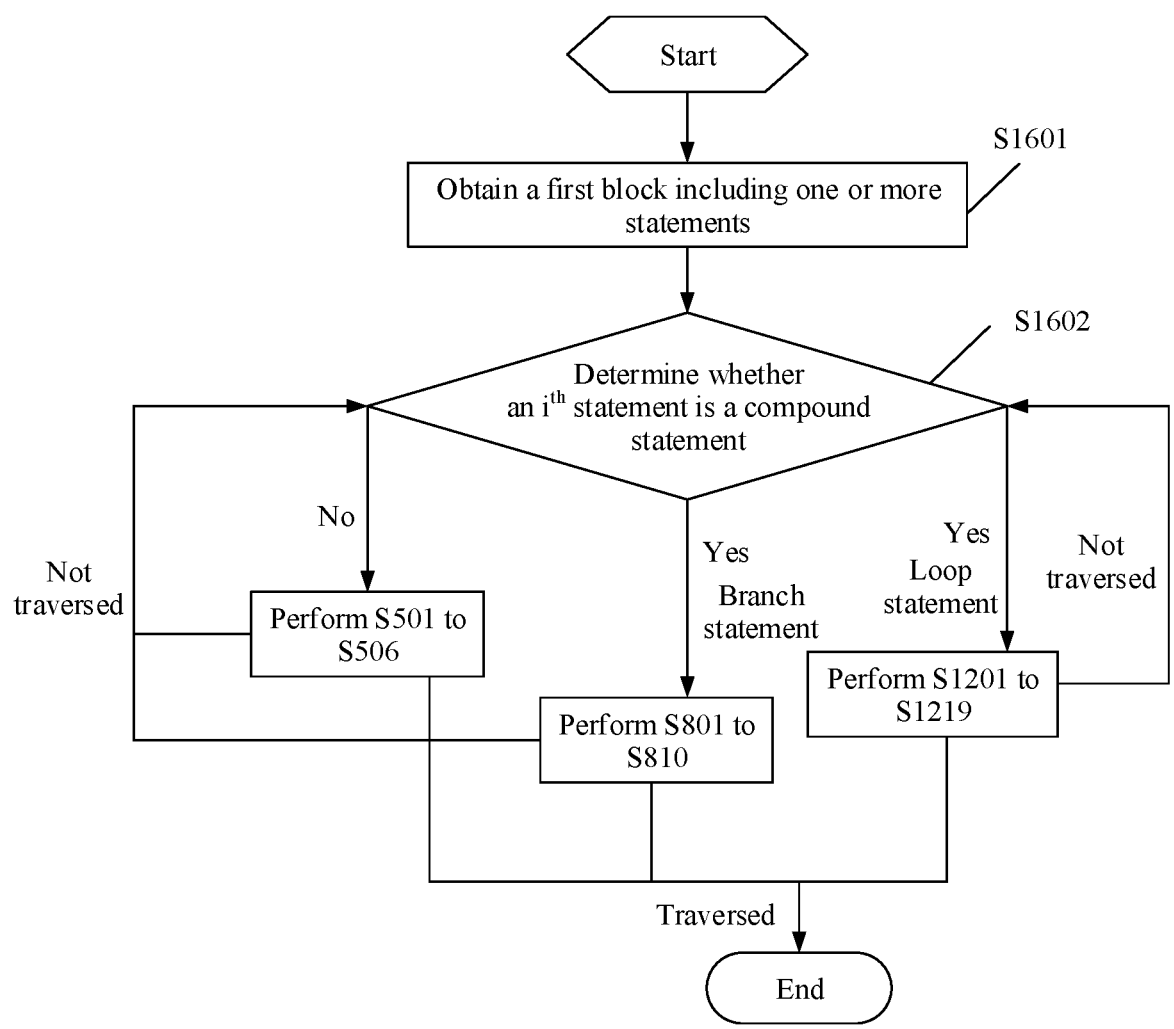
FIG. 16 is a flowchart of yet another synchronization instruction insertion method according to an embodiment of this application.

In some implementations, the program that has a sequential structure, the program that has a branch structure, and the program that has a loop structure may be nested in any form. For example, the program that has a branch structure is nested in the program that has a sequential structure. For another example, the program that has a loop structure is nested in the program that has a sequential structure. For another example, a plurality of layers of branch statements are nested, a plurality of layers of loop statements are nested, hybrid nesting is performed on a branch statement and a loop statement. This is not limited in this application. In any case, according to the synchronization instruction insertion method provided in the embodiments of this application, each statement included in a program block is processed. FIG. 16 is a flowchart of a synchronization instruction insertion method according to an embodiment of this application. As shown in FIG. 16, the method may include the following steps.

S1601: Obtain a first program block including one or more statements.

Each of the one or more statements includes one or more function instructions. The statement may be a single function instruction or a compound statement.

The statements included in the first program block are traversed starting from a first statement according to a direction of an arrangement sequence of the statements included in the first program block. Whether a currently traversed statement is a compound statement is determined. In other words, S1602 is performed. It is assumed that the first program block includes n statements, an $i^{th}$ statement is the currently traversed statement, where i is an integer, and $i \in [1, n]$.

S1602: Determine whether the $i^{th}$ statement is a compound statement.

If the $i^{th}$ statement is not a compound statement, in other words, the $i^{th}$ statement is a single function instruction, the statements in the first program block are traversed along a first direction starting from the $i^{th}$ statement, and S501 to S506 are performed. For specific explanations, refer to the descriptions of S501 to S506 to insert a synchronization instruction pair.

It should be noted that if a function instruction that has no synchronization relationship with the $i^{th}$ statement is a function instruction in a compound statement, a push instruction may be inserted at the end of a structure of the compound statement including the function instruction, and a pop instruction may be inserted before the $i^{th}$ statement.

If the $i^{th}$ statement is a compound statement, statements in the compound statement are traversed, a synchronization instruction pair is inserted into the statements in the compound statement, and then the statement in the compound statement is synchronized with a statement outside the compound statement. The compound statement may be a branch statement or a loop statement.

For example, when the $i^{th}$ statement is a branch statement, S801 to S810 are performed. To be specific, a synchronization instruction pair is first inserted into statements in a branch structure of the branch statement. Then, synchronization is established between the statement in the branch structure and a statement outside the branch structure. Recursive return is performed, to continue to traverse an outer block. For specific explanations, refer to the descriptions of S801 to S810.

For another example, when the traversed statement is a loop statement, S1201 to S1219 are performed. To be specific, a synchronization instruction pair is first inserted into statements in a loop body of the loop statement. Then, synchronization is established between the statement in the loop body and a statement outside the loop body. Recursive return is performed, to continue to traverse an outer block.

When the compound statement is traversed, the statement in the compound statement is processed first, recursive return is performed, and then the statement outside the compound statement is processed. In this way, an insertion process of the synchronization instruction pair is completed for an entire program.

In the embodiments provided in this application, the methods provided in the embodiments of this application are described from a perspective of a computing apparatus. It may be understood that, to implement functions in the methods provided in the foregoing embodiments of this application, the computing apparatus includes corresponding hardware structures and/or software modules for performing the functions. A person skilled in the art should easily be aware that, in combination with the examples described in the embodiments disclosed in this specification, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the computing apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. In an actual implementation, another division manner may be used.

Figure 17:
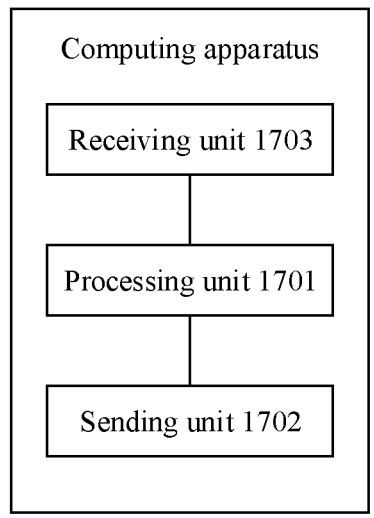
FIG. 17 is a schematic composition diagram of a computing apparatus according to an embodiment of this application.

When each function module is obtained through division based on each corresponding function, FIG. 17 is a possible schematic composition diagram of the computing apparatus in the foregoing embodiments. The computing apparatus can perform the steps described in any one of the method embodiments of this application. As shown in FIG. 17, the computing apparatus is a computer device or a computing apparatus that supports the computer device in implementing the methods provided in the embodiments. For example, the computing apparatus may be a chip system or a computer device. The computing apparatus may include a processing unit 1701.

The processing unit 1701 is configured to support the computing apparatus in performing the methods described in the embodiments of this application. For example, the processing unit 1701 is configured to perform or configured to support the computing apparatus in performing S501 to S505 in the synchronization instruction insertion method shown in FIGS. 5, S801 to S810 in the synchronization instruction insertion method shown in FIG. 8A and FIG. 8B, S1201 to S1219 in the synchronization instruction insertion method shown in FIG. 12A to FIG. 12C, and S1601, S1602, S501 to S505, S801 to S810, and S1201 to S1219 in the synchronization instruction insertion method shown in FIG. 16.

In this embodiment of this application, as shown in FIG. 17, the computing apparatus may further include a sending unit 1702 and a receiving unit 1703.

The sending unit 1702 is configured to send a program into which a synchronization instruction pair is inserted.

The receiving unit 1703 is configured to receive a program into which the synchronization instruction pair needs to be inserted.

It should be noted that all related content of the steps in the foregoing method embodiments may be cited in function descriptions of corresponding function modules. Details are not described herein.

The computing apparatus provided in this embodiment of this application is configured to perform the method in any one of the foregoing embodiments, and therefore can achieve a same effect as the methods in the foregoing embodiments.

Figure 18:
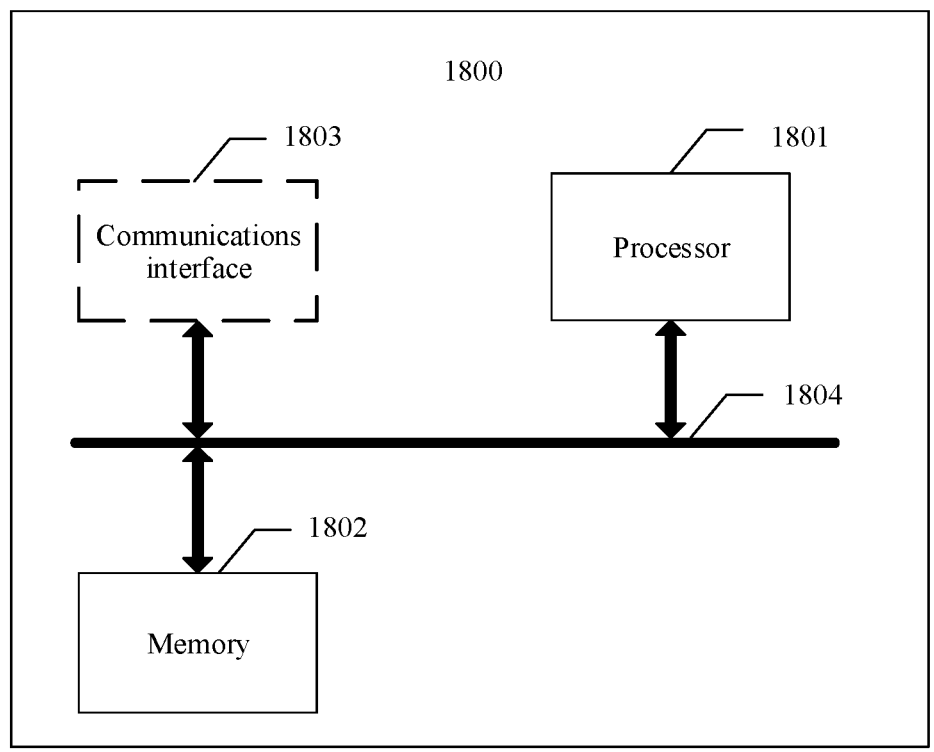
FIG. 18 is a schematic composition diagram of a chip system according to an embodiment of this application.

FIG. 18 shows a chip system 1800 according to an embodiment of this application. The chip system 1800 is configured to execute a computer program into which a synchronization instruction is inserted according to the synchronization instruction insertion method provided in the embodiments of this application, to implement a corresponding function. The chip system 1800 may be an artificial intelligence (Artificial Intelligence, AI) chip. The chip system 1800 may include one or more chips, or may include a chip and another discrete component.

The chip system 1800 may further include at least one memory 1802, configured to store the computer program into which the synchronization instruction is inserted according to the synchronization instruction insertion method provided in the embodiments of this application. The memory 1802 is coupled to a processor 1801. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1801 may operate with the memory 1802. The processor 1801 may execute a program instruction stored in the memory 1802. The at least one memory may be included in the processor.

The chip system 1800 may further include a communications interface 1803, configured to communicate with another device through a transmission medium, so that an apparatus in the chip system 1800 can communicate with the another device. The processor 1801 receives and sends computer programs through the communications interface 1803, and is configured to execute the computer program into which the synchronization instruction is inserted.

In this embodiment of this application, a specific connection medium between the communications interface 1803, the processor 1801, and the memory 1802 is not limited. In this embodiment of this application, in FIG. 18, the communications interface 1803, the processor 1801, and the memory 1802 are connected through a bus 1804. The bus is represented by using a thick line in FIG. 18. A connection manner between other components is merely an example for description, and constitutes no limitation. The bus may be classified into an address bus, a data bus, a control bus, and the like. For ease of representation, only one thick line is used to represent the bus in FIG. 18, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a nonvolatile memory, such as a hard disk drive (hard disk drive, HDD) or a solid-state drive (solid-state drive, SSD), or may be a volatile memory (volatile memory), such as a random access memory (random-access memory, RAM). The memory is any other medium that can be used to carry or store expected program code in a form of an instruction or a data structure and that can be accessed by a computer. However, this is not limited thereto. The memory in this embodiment of this application may alternatively be a circuit or any other apparatus that can implement a storage function, and is configured to store the program instruction and/or the data.

The foregoing descriptions about implementations allow a person skilled in the art to clearly understand that, for the purpose of convenient and brief description, division into the foregoing function modules is used as an example for illustration. In actual application, the foregoing functions can be allocated to different function modules and implemented based on a requirement. To be specific, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

All or some of the foregoing methods in the embodiments of this application may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A synchronization instruction insertion method, comprising:
    obtaining a first program block comprising one or more statements, wherein each of the one or more statements comprises one or more function instructions;
    determining a first function instruction and a second function instruction between which data dependency exists in the first program block;
    inserting a synchronization instruction pair between a first statement comprising the first function instruction and a second statement comprising the second function instruction;
    indicating, by using a first synchronization path graph, a directed dependency relationship between synchronized function instructions;
    determining a third function instruction and a fourth function instruction between which data dependency exists in the first program block;
    determining that a synchronization path from a node corresponding to the third function instruction to a node corresponding to the fourth function instruction is unreachable in the first synchronization path graph; and
    in response to determining that the synchronization path from the node corresponding to the third function instruction to the node corresponding to the fourth function instruction is unreachable in the first synchronization path graph, inserting a synchronization instruction pair between a third statement comprising the third function instruction and a fourth statement comprising the fourth function instruction.

2. The method according to claim 1, wherein the first function instruction and the second function instruction access data at a same address, and at least one of the first function instruction or the second function instruction updates the data.

3. The method according to claim 1, wherein address ranges of data accessed by the first function instruction and the second function instruction overlap, and at least one of the first function instruction or the second function instruction updates the data.

4. The method according to claim 1, wherein the first function instruction and the second function instruction transfer data by using shared storage space.

5. The method according to claim 1, wherein the first synchronization path graph comprises a plurality of function instruction nodes and a synchronization path between the plurality of function instruction nodes, each of the plurality of function instruction nodes corresponds to one function instruction, the synchronization path comprises a serial synchronization path and an instruction synchronization path, the serial synchronization path connects nodes corresponding to two function instructions between which serial dependency exists, the instruction synchronization path connects nodes corresponding to two function instructions between which data dependency exists, and the serial dependency is a dependency relationship between function instructions executed in a serial manner.

6. The method according to claim 5, wherein the method further comprises:
    establishing, in the first synchronization path graph, the instruction synchronization path between a node of the first function instruction and a node of the second function instruction.

7. The method according to claim 5, wherein the method further comprises:
    determining the first function instruction and a fifth function instruction between which serial dependency exists in the first program block; and
    establishing, in the first synchronization path graph, the serial synchronization path between a node of the first function instruction and a node of the fifth function instruction.

8. The method according to claim 7, wherein the first program block comprises a loop statement, the loop statement comprises a plurality of function instructions, and the method further comprises:
    determining a sixth function instruction and a seventh function instruction between which data dependency exists in the loop statement; and
    determining that a synchronization path from a node corresponding to the seventh function instruction to a node corresponding to the sixth function instruction is unreachable in the first synchronization path graph and a second synchronization path graph, and inserting a synchronization instruction pair between a fifth statement comprising the sixth function instruction and a sixth statement comprising the seventh function instruction, wherein the second synchronization path graph indicates an additional directed dependency relationship between synchronized function instructions in the loop statement, the second synchronization path graph comprises an additional plurality of function instruction nodes and an additional synchronization path between the additional plurality of function instruction nodes, and a direction of the additional synchronization path is different from a direction of the synchronization path.

9. The method according to claim 8, wherein the synchronization instruction pair comprises a first synchronization instruction and a second synchronization instruction, and the method further comprises at least one of:
configuring the second synchronization instruction for the first synchronization instruction; or
configuring the first synchronization instruction for the second synchronization instruction.

10. The method according to claim 9, wherein the method further comprises:
in response to determining that the configured second synchronization instruction and the configured first synchronization instruction constitute the synchronization instruction pair, configuring hoisting tags for the configured second synchronization instruction and the configured first synchronization instruction; and
in response to determining that the loop statement is nested in an additional loop statement, hoisting the configured second synchronization instruction and the configured first synchronization instruction.

11. The method according to claim 8, wherein the synchronization instruction pair comprises a first synchronization instruction and a second synchronization instruction, and the method further comprises at least one of:
inserting the first synchronization instruction before a beginning statement in the first program block; or
inserting the second synchronization instruction after a last statement in the first program block.

12. The method according to claim 8, wherein the synchronization instruction pair comprises a first synchronization instruction and a second synchronization instruction, and the method further comprises at least one of:
inserting the first synchronization instruction after an eighth function instruction outside the loop statement in the first program block, wherein data dependency exists between the eighth function instruction and the seventh function instruction in the loop statement, or a synchronization path from a node corresponding to the eighth function instruction to the node corresponding to the seventh function instruction in the first synchronization path graph is reachable; or
inserting the second synchronization instruction before the eighth function instruction outside the loop statement in the first program block, wherein the data dependency exists between the eighth function instruction and the seventh function instruction in the loop statement, or the synchronization path from the node corresponding to the eighth function instruction to the node corresponding to the seventh function instruction in the first synchronization path graph is reachable.

13. An apparatus for synchronization instruction insertion, wherein the apparatus comprises:
at least one processor; and
one or more memories coupled to the at least one processor and storing executable program instructions that, when executed by the at least one processor, cause the at least one processor to:
obtain a first program block comprising one or more statements, wherein each of the one or more statements comprises one or more function instructions;
determine a first function instruction and a second function instruction between which data dependency exists in the first program block;
insert a synchronization instruction pair between a first statement comprising the first function instruction and a second statement comprising the second function instruction;
indicate, by using a first synchronization path graph, a directed dependency relationship between synchronized function instructions;
determine a third function instruction and a fourth function instruction between which data dependency exists in the first program block;
determine that a synchronization path from a node corresponding to the third function instruction to a node corresponding to the fourth function instruction is unreachable in the first synchronization path graph; and
in response to determining that the synchronization path from the node corresponding to the third function instruction to the node corresponding to the fourth function instruction is unreachable in the first synchronization path graph, insert a synchronization instruction pair between a third statement comprising the third function instruction and a fourth statement comprising the fourth function instruction.

14. The apparatus according to claim 13, wherein the first function instruction and the second function instruction access data at a same address, and at least one of the first function instruction or the second function instruction updates the data.

15. The apparatus according to claim 13, wherein address ranges of data accessed by the first function instruction and the second function instruction overlap, and at least one of the first function instruction or the second function instruction updates the data.

16. The apparatus according to claim 13, wherein the first function instruction and the second function instruction transfer data by using shared storage space.

17. The apparatus according to claim 13,
wherein the first synchronization path graph comprises a plurality of function instruction nodes and a synchronization path between the plurality of function instruction nodes, each of the plurality of function instruction nodes corresponds to one function instruction, the synchronization path comprises a serial synchronization path and an instruction synchronization path, the serial synchronization path connects nodes corresponding to two function instructions between which serial dependency exists, the instruction synchronization path connects nodes corresponding to two function instructions between which data dependency exists, and the serial dependency is a dependency relationship between function instructions executed by one processing unit in a serial manner.

18. A non-transitory computer-readable storage medium storing a program, wherein the program comprises instructions, and when the instructions are executed by a computer, cause the computer to perform operations comprising:

obtaining a first program block comprising one or more statements, wherein each of the one or more statements comprises one or more function instructions;

determining a first function instruction and a second function instruction between which data dependency exists in the first program block;

inserting a synchronization instruction pair between a first statement comprising the first function instruction and a second statement comprising the second function instruction;

indicating, by using a first synchronization path graph, a directed dependency relationship between synchronized function instructions;

determining a third function instruction and a fourth function instruction between which data dependency exists in the first program block;

determining that a synchronization path from a node corresponding to the third function instruction to a node corresponding to the fourth function instruction is unreachable in the first synchronization path graph; and in response to determining that the synchronization path from the node corresponding to the third function instruction to the node corresponding to the fourth function instruction is unreachable in the first synchronization path graph, inserting a synchronization instruction pair between a third statement comprising the third function instruction and a fourth statement comprising the fourth function instruction.

19. The non-transitory computer-readable storage medium according to claim 18, wherein the first function instruction and the second function instruction access data at a same address, and at least one of the first function instruction or the second function instruction updates the data.

* * * * *